(12) United States Patent
Uchida et al.

(10) Patent No.: US 12,543,355 B2
(45) Date of Patent: Feb. 3, 2026

(54) SEMICONDUCTOR DEVICE

(71) Applicant: FUJI ELECTRIC CO., LTD., Kanagawa (JP)

(72) Inventors: Misaki Uchida, Matsumoto (JP); Takashi Yoshimura, Matsumoto (JP); Hiroshi Takishita, Matsumoto (JP); Shuntaro Yaguchi, Matsumoto (JP); Seiji Noguchi, Matsumoto (JP); Yosuke Sakurai, Azumino (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 375 days.

(21) Appl. No.: 17/970,496

(22) Filed: Oct. 20, 2022

(65) Prior Publication Data
US 2023/0039920 A1    Feb. 9, 2023

Related U.S. Application Data

(63) Continuation of application No. PCT/JP2021/041952, filed on Nov. 15, 2021.

(30) Foreign Application Priority Data

Nov. 17, 2020  (JP) ................. 2020-190971

(51) Int. Cl.
*H10D 62/13* (2025.01)
*H10D 8/00* (2025.01)
(Continued)

(52) U.S. Cl.
CPC .......... *H10D 62/142* (2025.01); *H10D 8/422* (2025.01); *H10D 12/481* (2025.01); *H10D 62/53* (2025.01); *H10D 84/617* (2025.01)

(58) Field of Classification Search
None
See application file for complete search history.

(56) References Cited

U.S. PATENT DOCUMENTS

2008/0315364 A1   12/2008   Nemoto
2013/0249058 A1    9/2013   Neidhart
(Continued)

FOREIGN PATENT DOCUMENTS

CN        101305470 A      11/2008
CN        111886682 A      11/2020
(Continued)

OTHER PUBLICATIONS

Kato translation WO 2020100995 (Year: 2020).*
(Continued)

*Primary Examiner* — Erik T. K. Peterson
*Assistant Examiner* — Christopher A. Schodde

(57) ABSTRACT

Provided is a semiconductor device including: a buffer region having a doping concentration higher than a bulk donor concentration; a first low-concentration hydrogen peak in the buffer region; a second low-concentration hydrogen peak in the buffer region closer to a lower surface than the first low-concentration hydrogen peak; a high-concentration hydrogen peak in the buffer region closer to the lower surface than the second low-concentration hydrogen peak, the high-concentration hydrogen peak having a hydrogen chemical concentration higher than that of the second low-concentration hydrogen peak; and a flat region including a region between the two low-concentration hydrogen peaks and a region including the second low-concentration hydrogen peak, and having a doping concentration higher than a bulk donor concentration, an average value of the doping concentration being equal to or smaller than a local minimum value of a doping concentration between the second (Continued)

low-concentration hydrogen peak and the high-concentration hydrogen peak.

19 Claims, 13 Drawing Sheets

(51) Int. Cl.
*H10D 12/00* (2025.01)
*H10D 62/53* (2025.01)
*H10D 84/60* (2025.01)

(56) References Cited

U.S. PATENT DOCUMENTS

| | | |
|---|---|---|
| 2014/0246750 A1 | 9/2014 | Takishita |
| 2015/0179441 A1* | 6/2015 | Onozawa ............... H10D 62/53 257/109 |
| 2015/0214347 A1 | 7/2015 | Falck |
| 2015/0270132 A1 | 9/2015 | Laven |
| 2015/0364613 A1 | 12/2015 | Onozawa |
| 2016/0141399 A1 | 5/2016 | Jelinek |
| 2016/0329401 A1 | 11/2016 | Laven |
| 2016/0372329 A1 | 12/2016 | Jelinek |
| 2017/0271447 A1 | 9/2017 | Tamura |
| 2017/0278929 A1 | 9/2017 | Imagawa |
| 2018/0012762 A1 | 1/2018 | Mukai |
| 2020/0194550 A1 | 6/2020 | Baburske |
| 2021/0043739 A1* | 2/2021 | Kato ..................... H01L 21/265 |
| 2021/0050215 A1* | 2/2021 | Agata .................. H10D 12/481 |
| 2021/0082702 A1 | 3/2021 | Agata |
| 2021/0104407 A1 | 4/2021 | Meguro |
| 2022/0084826 A1* | 3/2022 | Kato ..................... H10D 12/481 |

FOREIGN PATENT DOCUMENTS

| | | | |
|---|---|---|---|
| DE | 112019001738 T5 | 12/2020 | |
| DE | 112019002290 T5 | 4/2021 | |
| JP | 2018195757 A | 12/2018 | |
| WO | 2013089256 A1 | 6/2013 | |
| WO | 2014156849 A1 | 10/2014 | |
| WO | 2016204126 A1 | 12/2016 | |
| WO | 2016204227 A1 | 12/2016 | |
| WO | 2017047285 A1 | 3/2017 | |
| WO | 2020080295 A1 | 4/2020 | |
| WO | WO-2020100995 A1 * | 5/2020 | ........... H01L 21/265 |
| WO | WO-2020100997 A1 * | 5/2020 | ........... H01L 21/221 |
| WO | 2020138218 A1 | 7/2020 | |
| WO | WO-2021125140 A1 * | 6/2021 | ........... H01L 21/265 |

OTHER PUBLICATIONS

Agata Translation WO 2020100997 (Year: 2020).*
Kato Translation WO 2021125140 (Year: 2021).*
International Search Report and (ISA/237) Written Opinion of the International Search Authority for International Patent Application No. PCT/JP2021/041952, mailed by the Japan Patent Office on Feb. 8, 2022.
Office Action issued for counterpart German Application 112021001364.5, issued by the German Patent and Trademark Office on Apr. 8, 2025 (received on Apr. 9, 2025).
Office Action issued for counterpart Chinese Application 202180030568.6, issued by The State Intellectual Property Office of People's Republic of China on Nov. 21, 2025.

* cited by examiner

SEMICONDUCTOR DEVICE

The contents of the following Japanese patent application(s) are incorporated herein by reference:
NO. 2020-190971 filed in JP on Nov. 17, 2020
NO. PCT/JP2021/041952 filed in WO on Nov. 15, 2021

BACKGROUND

1. Technical Field

The present invention relates to a semiconductor device.

2. Related Art

Conventionally, a semiconductor device including a buffer region that functions as a field stop layer is known (see, for example, Patent Document 1).
(Patent Document 1) U.S. Patent Application Publication No. 2016/0141399

DESCRIPTION OF EXEMPLARY EMBODIMENTS

Figure 1:
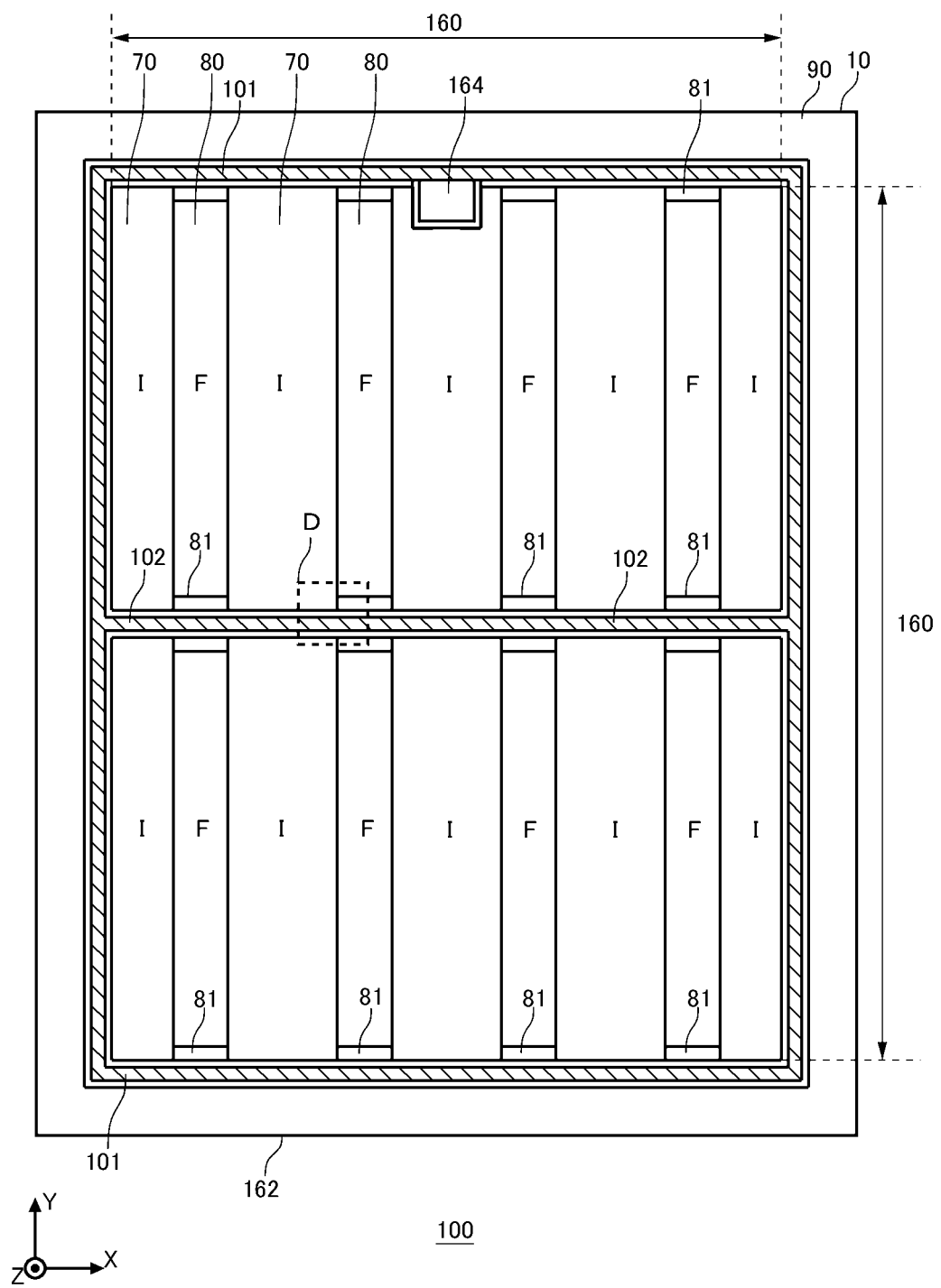
FIG. 1 is a top view showing an example of a semiconductor device 100.

Hereinafter, the invention will be described through embodiments of the invention, but the following embodiments do not limit the invention according to claims. In addition, not all of the combinations of features described in the embodiments are essential to the solving means of the invention.

In the present specification, one side in a direction parallel to a depth direction of a semiconductor substrate is referred to as "upper", and the other side is referred to as "lower". One surface of two principal surfaces of a substrate, a layer, or other members is referred to as an upper surface, and the other surface is referred to as a lower surface. "Upper" and "lower" directions are not limited to a direction of gravity, or a direction in which a semiconductor device is mounted.

In the present specification, technical matters may be described using orthogonal coordinate axes of an X axis, a Y axis, and a Z axis. The orthogonal coordinate axes merely specify relative positions of components, and do not limit a specific direction. For example, the Z axis is not limited to indicate the height direction with respect to the ground. Note that a +Z axis direction and a −Z axis direction are directions opposite to each other. When the Z axis direction is described without describing the signs, it means that the direction is parallel to the +Z axis and the −Z axis.

In the present specification, orthogonal axes parallel to the upper surface and the lower surface of the semiconductor substrate are referred to as the X axis and the Y axis. Further, an axis perpendicular to the upper surface and the lower surface of the semiconductor substrate is referred to as the Z axis. In the present specification, the direction of the Z axis may be referred to as the depth direction. Further, in the present specification, a direction parallel to the upper surface and the lower surface of the semiconductor substrate may be referred to as a horizontal direction, including an X axis direction and a Y axis direction.

In addition, a region from the center of the semiconductor substrate in the depth direction to the upper surface of the semiconductor substrate may be referred to as an upper surface side. Similarly, a region from the center of the semiconductor substrate in the depth direction to the lower surface of the semiconductor substrate may be referred to as a lower surface side.

In the present specification, a case where a term such as "same" or "equal" is mentioned may include a case where an error due to a variation in manufacturing or the like is included. The error is, for example, within 10%.

In the present specification, a conductivity type of a doping region where doping has been carried out with an impurity is described as a P type or an N type. In the present specification, the impurity may particularly mean either a donor of the N type or an acceptor of the P type, and may be described as a dopant. In the present specification, doping means introducing the donor or the acceptor into the semiconductor substrate and turning it into a semiconductor presenting a conductivity type of the N type, or a semiconductor presenting conductivity type of the P type.

In the present specification, a doping concentration means a concentration of the donor or a concentration of the acceptor in a thermal equilibrium state. In the present specification, a net doping concentration means a net concentration obtained by adding the donor concentration set as a positive ion concentration to the acceptor concentration set as a negative ion concentration, taking into account of polarities of charges. As an example, when the donor concentration is $N_D$ and the acceptor concentration is $N_A$, the net doping concentration at any position is given as $N_D$-$N_A$. In the present specification, the net doping concentration may be simply referred to as the doping concentration.

The donor has a function of supplying electrons to a semiconductor. The acceptor has a function of receiving electrons from the semiconductor. The donor and the acceptor are not limited to the impurities themselves. For example, a VOH defect which is a combination of a vacancy (V), oxygen (O), and hydrogen (H) existing in the semiconductor functions as the donor that supplies electrons. In the present specification, the VOH defect may be referred to as a hydrogen donor.

In the present specification, a bulk donor of the N type is distributed in the entire semiconductor substrate. The bulk donor is a dopant donor substantially uniformly contained in an ingot during the manufacture of the ingot from which the semiconductor substrate is made. The bulk donor of the present example is an element other than hydrogen. The dopant of the bulk donor is, for example, phosphorus, antimony, arsenic, selenium, or sulfur, but the invention is not limited to these. The bulk donor of the present example is phosphorus. The bulk donor is also contained in the P type region. The semiconductor substrate may be a wafer cut out from a semiconductor ingot, or may be a chip obtained by singulating the wafer. The semiconductor ingot may be manufactured by either a Chokralski method (CZ method), a magnetic field applied Chokralski method (MCZ method), or a float zone method (FZ method). The ingot of the present example is manufactured by the MCZ method. An oxygen concentration included in the substrate manufactured by the MCZ method is, for example, $1 \times 10^{17}$ to $7 \times 10^{17}/cm^3$. The oxygen concentration included in the substrate manufactured by the FZ method is, for example, $1 \times 10^{15}$ to $5 \times 10^{16}/cm^3$. It tends to be easier to generate the hydrogen donor with a higher oxygen concentration. As the bulk donor concentration, the chemical concentration of the bulk donor distributed throughout the semiconductor substrate may be used, or a value from 90% to 100% of the chemical concentration may be used. Further, for the semiconductor substrate, a non-doped substrate which does not contain a dopant such as phosphorus may be used. In this case, the bulk donor concentration ($D_b$) of the non-doped substrate is, for example, $1 \times 10^{10}/cm^3$ or more and $5 \times 10^{12}/cm^3$ or less. The bulk donor concentration ($D_b$) of the non-doped substrate is preferably $1 \times 10^{11}/cm^3$ or more. The bulk donor concentration ($D_b$) of the non-doped substrate is preferably $5 \times 10^{12}/cm^3$ or less. Note that each concentration in the present invention may be a value at room temperature. As the value at room temperature, a value at 300 K (Kelvin) (about 26.9° C.) may be used as an example.

In the present specification, a description of a P+ type or an N+ type means a higher doping concentration than that of the P type or the N type, and a description of a P− type or an N− type means a lower doping concentration than that of the P type or the N type. Further, in the present specification, a description of a P++ type or an N++ type means a higher doping concentration than that of the P+ type or the N+ type. The unit system in the present specification is an SI unit system unless otherwise specified. The unit of length may be expressed in cm, but various calculations may be performed after conversion into meters (m).

A chemical concentration in the present specification indicates an atomic density of an impurity measured regardless of an electrical activation state. The chemical concentration can be measured by, for example, secondary ion mass spectrometry (SIMS). The net doping concentration described above can be measured by voltage-capacitance profiling (CV profiling). Further, a carrier concentration measured by spreading resistance profiling (SRP method) may be set as the net doping concentration. The carrier concentration measured by the CV profiling or the SRP method may be a value in a thermal equilibrium state.

Further, in a region of the N type, the donor concentration is sufficiently higher than the acceptor concentration, and thus the carrier concentration of the region may be set as the donor concentration. Similarly, in a region of the P type, the carrier concentration of the region may be set as the acceptor concentration. In the present specification, the doping concentration of the N type region may be referred to as the donor concentration, and the doping concentration of the P type region may be referred to as the acceptor concentration.

Further, when a concentration distribution of the donor, acceptor, or net doping has a peak in a region, a value of the peak may be set as the concentration of the donor, acceptor, or net doping in the region. In a case where the concentration of the donor, acceptor, or net doping is substantially uniform in a region, or the like, an average value of the concentration of the donor, acceptor, or net doping in the region may be set as the concentration of the donor, acceptor, or net doping. In the present specification, atoms/cm$^3$ or /cm$^3$ is used to indicate a concentration per unit volume. This unit is used for the donor or acceptor concentration or the chemical concentration in the semiconductor substrate. A notation of atoms may be omitted.

The carrier concentration measured by the SRP method may be lower than the concentration of the donor or the acceptor. In a range where a current flows when a spreading resistance is measured, carrier mobility of the semiconductor substrate may be lower than a value in a crystalline state. The reduction in carrier mobility occurs when carriers are scattered due to disorder (disorder) of a crystal structure due to a lattice defect or the like.

The concentration of the donor or the acceptor calculated from the carrier concentration measured by the CV profiling or the SRP method may be lower than a chemical concentration of an element indicating the donor or the acceptor. As an example, in a silicon semiconductor, a donor concentration of phosphorus or arsenic serving as a donor, or an acceptor concentration of boron (boron) serving as an acceptor is approximately 99% of chemical concentrations of these. On the other hand, in the silicon semiconductor, a donor concentration of hydrogen serving as a donor is approximately 0.1% to 10% of a chemical concentration of hydrogen.

FIG. 1 is a top view showing an example of a semiconductor device 100. FIG. 1 shows a position at which each member is projected on an upper surface of a semiconductor substrate 10. FIG. 1 shows merely some members of the semiconductor device 100, and omits illustrations of some members.

The semiconductor device 100 includes the semiconductor substrate 10. The semiconductor substrate 10 is a substrate that is formed of a semiconductor material. As an example, the semiconductor substrate 10 is a silicon substrate, but a material of the semiconductor substrate 10 is not limited to silicon.

The semiconductor substrate 10 has an end side 162 in a top view. When merely referred to as the top view in the present specification, it means that the semiconductor substrate 10 is viewed from an upper surface side. The semiconductor substrate 10 of the present example has two sets of end sides 162 opposite to each other in the top view. In FIG. 1, the X axis and the Y axis are parallel to any of the end sides 162. In addition, the Z axis is perpendicular to the upper surface of the semiconductor substrate 10.

The semiconductor substrate 10 is provided with an active portion 160. The active portion 160 is a region where a main current flows in the depth direction between the upper surface and a lower surface of the semiconductor substrate 10 when the semiconductor device 100 operates. An emitter electrode is provided above the active portion 160, but is omitted in FIG. 1.

The active portion 160 is provided with at least one of a transistor portion 70 including a transistor element such as an IGBT, and a diode portion 80 including a diode element such as a freewheeling diode (FWD). In the example of FIG. 1, the transistor portion 70 and the diode portion 80 are alternately arranged along a predetermined array direction (the X axis direction in the present example) on the upper surface of the semiconductor substrate 10. The active portion 160 in another example may be provided with only one of the transistor portion 70 and the diode portion 80.

In FIG. 1, a region where each of the transistor portions 70 is arranged is indicated by a symbol "I", and a region where each of the diode portions 80 is arranged is indicated by a symbol "F". In the present specification, a direction perpendicular to the array direction in the top view may be referred to as an extending direction (the Y axis direction in FIG. 1). Each of the transistor portions 70 and the diode portions 80 may have a longitudinal length in the extending direction. In other words, the length of each of the transistor portions 70 in the Y axis direction is larger than the width in the X axis direction. Similarly, the length of each of the diode portions 80 in the Y axis direction is larger than the width in the X axis direction. The extending direction of the transistor portion 70 and the diode portion 80, and a longitudinal direction of each trench portion to be described later may be the same.

Each of the diode portions 80 includes a cathode region of the N+ type in a region in contact with the lower surface of the semiconductor substrate 10. In the present specification, a region where the cathode region is provided is referred to as the diode portion 80. In other words, the diode portion 80 is a region that overlaps with the cathode region in the top view. On the lower surface of the semiconductor substrate 10, a collector region of the P+ type may be provided in a region other than the cathode region. In the present specification, the diode portion 80 may also include an extension region 81 where the diode portion 80 extends to a gate runner to be described later in the Y axis direction. The collector region is provided on a lower surface of the extension region 81.

The transistor portion 70 has the collector region of the P+ type in a region in contact with the lower surface of the semiconductor substrate 10. Further, in the transistor portion 70, an emitter region of the N type, a base region of the P type, and a gate structure having a gate conductive portion and a gate dielectric film are periodically arranged on the upper surface side of the semiconductor substrate 10.

The semiconductor device 100 may have one or more pads above the semiconductor substrate 10. The semiconductor device 100 of the present example has a gate pad 164. The semiconductor device 100 may have a pad such as an anode pad, a cathode pad, and a current detection pad. Each pad is arranged in a region close to the end side 162. The region close to the end side 162 refers to a region between the end side 162 and the emitter electrode in the top view. When the semiconductor device 100 is mounted, each pad may be connected to an external circuit via a wiring such as a wire.

A gate potential is applied to the gate pad 164. The gate pad 164 is electrically connected to a conductive portion of a gate trench portion of the active portion 160. The semiconductor device 100 includes a gate runner that connects the gate pad 164 and the gate trench portion. In FIG. 1, the gate runner is hatched with diagonal lines.

The gate runner of the present example has an outer circumferential gate runner 101 and an active-side gate runner 102. The outer circumferential gate runner 101 is arranged between the active portion 160 and the end side 162 of the semiconductor substrate 10 in the top view. The outer circumferential gate runner 101 of the present example encloses the active portion 160 in the top view. A region enclosed by the outer circumferential gate runner 101 in the top view may be the active portion 160. Further, the outer circumferential gate runner 101 is connected to the gate pad 164. The outer circumferential gate runner 101 is arranged above the semiconductor substrate 10. The outer circumferential gate runner 101 may be a metal wiring including aluminum.

The active-side gate runner 102 is provided in the active portion 160. Providing the active-side gate runner 102 in the active portion 160 can reduce a variation in wiring lengths from the gate pad 164 for each region of the semiconductor substrate 10.

The active-side gate runner 102 is connected to the gate trench portion of the active portion 160. The active-side gate runner 102 is arranged above the semiconductor substrate 10. The active-side gate runner 102 may be a wiring formed of a semiconductor such as polysilicon doped with an impurity.

The active-side gate runner 102 may be connected to the outer circumferential gate runner 101. The active-side gate runner 102 of the present example is provided extending in the X axis direction so as to cross the active portion 160 from one outer circumferential gate runner 101 to the other outer circumferential gate runner 101 substantially at the center of the Y axis direction. When the active portion 160 is divided by the active-side gate runner 102, the transistor portion 70 and the diode portion 80 may be alternately arranged in the X axis direction in each divided region.

Further, the semiconductor device 100 may include a temperature sensing portion (not shown) that is a PN junction diode formed of polysilicon or the like, and a current detection portion (not shown) that simulates an operation of the transistor portion provided in the active portion 160.

The semiconductor device 100 of the present example includes an edge termination structure portion 90 between the active portion 160 and the end side 162 in the top view. The edge termination structure portion 90 of the present example is arranged between the outer circumferential gate runner 101 and the end side 162. The edge termination structure portion 90 reduces an electric field strength on the upper surface side of the semiconductor substrate 10. The edge termination structure portion 90 may include at least one of a guard ring, a field plate, and a RESURF which are annularly provided to enclose the active portion 160.

Figure 2:
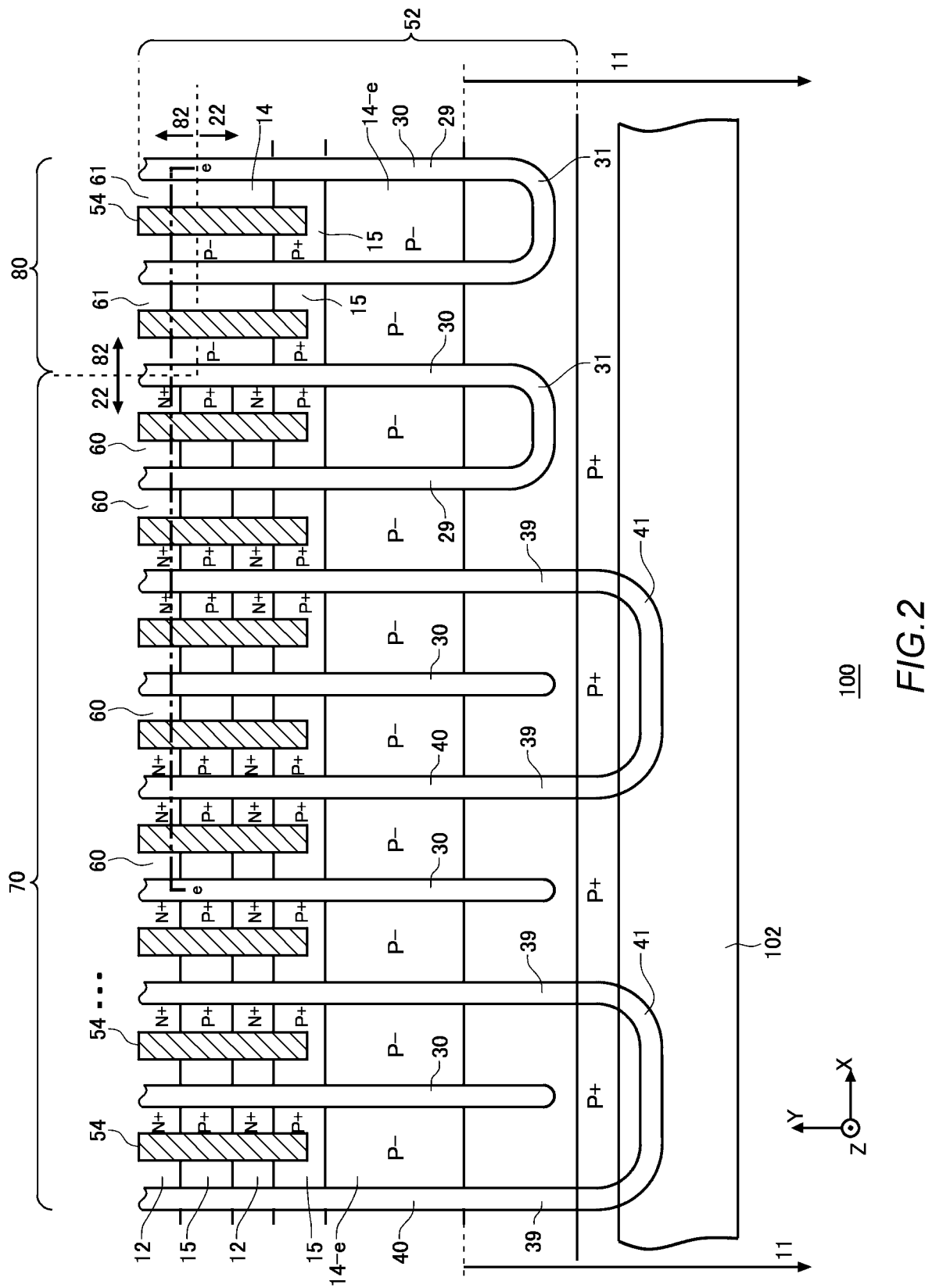
FIG. 2 is an enlarged view of a region D in FIG. 1.

FIG. 2 is an enlarged view of a region D in FIG. 1. The region D is a region including the transistor portion 70, the diode portion 80, and the active-side gate runner 102. The semiconductor device 100 of the present example includes a gate trench portion 40, a dummy trench portion 30, a well region 11, an emitter region 12, a base region 14, and a contact region 15 which are provided inside the upper surface side of the semiconductor substrate 10. The gate trench portion 40 and the dummy trench portion 30 each are an example of the trench portion. Further, the semiconductor device 100 of the present example includes an emitter electrode 52 and the active-side gate runner 102 that are provided above the upper surface of the semiconductor substrate 10. The emitter electrode 52 and the active-side gate runner 102 are provided apart from each other.

An interlayer dielectric film is provided between the emitter electrode 52 and the active-side gate runner 102, and the upper surface of the semiconductor substrate 10, but the interlayer dielectric film is omitted in FIG. 2. In the interlayer dielectric film of the present example, a contact hole 54 is provided penetrating through the interlayer dielectric film. In FIG. 2, each contact hole 54 is hatched with the diagonal lines.

The emitter electrode 52 is provided on the upper side of the gate trench portion 40, the dummy trench portion 30, the well region 11, the emitter region 12, the base region 14, and the contact region 15. The emitter electrode 52 is in contact with the emitter region 12, the contact region 15, and the base region 14 on the upper surface of the semiconductor substrate 10, through the contact hole 54. Further, the emitter electrode 52 is connected to a dummy conductive portion in the dummy trench portion 30 through the contact hole provided in the interlayer dielectric film. The emitter electrode 52 may be connected to the dummy conductive portion of the dummy trench portion 30 at an edge of the dummy trench portion 30 in the Y axis direction.

The active-side gate runner 102 is connected to the gate trench portion 40 through the contact hole provided in the interlayer dielectric film. The active-side gate runner 102 may be connected to a gate conductive portion of the gate trench portion 40 at an edge portion 41 of the gate trench portion 40 in the Y axis direction. The active-side gate runner 102 is not connected to the dummy conductive portion in the dummy trench portion 30.

The emitter electrode 52 is formed of a material including a metal. FIG. 2 shows a range where the emitter electrode 52 is provided. For example, at least a part of a region of the emitter electrode 52 is formed of aluminum or an aluminum-silicon alloy, for example, a metal alloy such as AlSi and AlSiCu. The emitter electrode 52 may have a barrier metal formed of titanium, a titanium compound, or the like below a region formed of aluminum or the like. Further, a plug, which is formed by embedding tungsten or the like so as to be in contact with the barrier metal and aluminum or the like, may be included in the contact hole.

The well region 11 is provided overlapping the active-side gate runner 102. The well region 11 is provided so as to extend with a predetermined width even in a range not overlapping the active-side gate runner 102. The well region 11 of the present example is provided away from an end of the contact hole 54 in the Y axis direction toward the active-side gate runner 102 side. The well region 11 is a second conductivity type region in which the doping concentration is higher than that of the base region 14. The base region 14 of the present example is a P− type, and the well region 11 is a P+ type.

Each of the transistor portion 70 and the diode portion 80 includes a plurality of trench portions arranged in the array direction. In the transistor portion 70 of the present example, one or more gate trench portions 40 and one or more dummy trench portions 30 are alternately provided along the array direction. In the diode portion 80 of the present example, the plurality of dummy trench portions 30 are provided along the array direction. In the diode portion 80 of the present example, the gate trench portion 40 is not provided.

The gate trench portion 40 of the present example may have two linear portions 39 extending along the extending direction perpendicular to the array direction (portions of a trench that are linear along the extending direction), and the edge portion 41 connecting the two linear portions 39. The extending direction in FIG. 2 is the Y axis direction.

At least a part of the edge portion 41 is preferably provided in a curved shape in a top view. By connecting end portions of the two linear portions 39 in the Y axis direction by the edge portion 41, it is possible to reduce the electric field strength at the end portions of the linear portions 39.

In the transistor portion 70, the dummy trench portions 30 are provided between the respective linear portions 39 of the gate trench portions 40. Between the respective linear portions 39, one dummy trench portion 30 may be provided or a plurality of dummy trench portions 30 may be provided. The dummy trench portion 30 may have a linear shape extending in the extending direction, or may have linear portions 29 and an edge portion 31 similar to the gate trench portion 40. The semiconductor device 100 shown in FIG. 2 includes both of the linear dummy trench portion 30 having no edge portion 31, and the dummy trench portion 30 having the edge portion 31.

A diffusion depth of the well region 11 may be deeper than the depth of the gate trench portion 40 and the dummy trench portion 30. The end portions of the gate trench portion 40 and the dummy trench portion 30 in the Y axis direction are provided in the well region 11 in a top view. In other words, the bottom portion of each trench portion in the depth direction is covered with the well region 11 at the end portion of each trench portion in the Y axis direction. With this configuration, the electric field strength on the bottom portion of each trench portion can be reduced.

A mesa portion is provided between the respective trench portions in the array direction. The mesa portion refers to a region sandwiched between the trench portions inside the semiconductor substrate 10. As an example, an upper end of the mesa portion is the upper surface of the semiconductor substrate 10. The depth position of the lower end of the mesa portion is the same as the depth position of the lower end of the trench portion. The mesa portion of the present example is provided extending in the extending direction (the Y axis direction) along the trench portion, on the upper surface of the semiconductor substrate 10. In the present example, a mesa portion 60 is provided in the transistor portion 70, and a mesa portion 61 is provided in the diode portion 80. In the case of simply mentioning "mesa portion" in the present specification, the portion refers to each of the mesa portion 60 and the mesa portion 61.

Each mesa portion is provided with the base region 14. In the mesa portion, a region arranged closest to the active-side gate runner 102, in the base region 14 exposed on the upper surface of the semiconductor substrate 10, is to be a base region 14-e. While FIG. 2 shows the base region 14-e arranged at one end portion of each mesa portion in the extending direction, the base region 14-e is also arranged at the other end portion of each mesa portion. Each mesa portion may be provided with at least one of the emitter region 12 of the first conductivity type or the contact region 15 of the second conductivity type in a region sandwiched between the base regions 14-e in the top view. The emitter region 12 of the present example is an N+ type, and the contact region 15 is a P+ type. The emitter region 12 and the contact region 15 may be provided between the base region 14 and the upper surface of the semiconductor substrate 10 in the depth direction.

The mesa portion 60 of the transistor portion 70 has the emitter region 12 exposed on the upper surface of the semiconductor substrate 10. The emitter region 12 is provided in contact with the gate trench portion 40. The mesa portion 60 in contact with the gate trench portion 40 may be provided with the contact region 15 exposed on the upper surface of the semiconductor substrate 10.

Each of the contact region 15 and the emitter region 12 in the mesa portion 60 is provided from one trench portion to the other trench portion in the X axis direction. As an example, the contact region 15 and the emitter region 12 in the mesa portion 60 are alternately arranged along the extending direction of the trench portion (the Y axis direction).

In another example, the contact region 15 and the emitter region 12 in the mesa portion 60 may be provided as stripes along the extending direction of the trench portion (the Y axis direction). For example, the emitter region 12 is provided in a region in contact with the trench portion, and the contact region 15 is provided in a region sandwiched between the emitter regions 12.

The mesa portion 61 of the diode portion 80 is not provided with the emitter region 12. The base region 14 and the contact region 15 may be provided on an upper surface of the mesa portion 61. In the region sandwiched between the base regions 14-e on the upper surface of the mesa portion 61, the contact region 15 may be provided in contact with each base region 14-e. The base region 14 may be provided in a region sandwiched between the contact regions 15 on the upper surface of the mesa portion 61. The base region 14 may be arranged in the entire region sandwiched between the contact regions 15.

The contact hole 54 is provided above each mesa portion. The contact hole 54 is arranged in the region sandwiched between the base regions 14-e. The contact hole 54 of the present example is provided above the respective regions of the contact region 15, the base region 14, and the emitter region 12. The contact hole 54 is not provided in regions corresponding to the base region 14-e and the well region 11. The contact hole 54 may be arranged at the center of the mesa portion 60 in the array direction (the X axis direction).

In the diode portion 80, a cathode region 82 of the N+ type is provided in a region adjacent to the lower surface of the semiconductor substrate 10. On the lower surface of the semiconductor substrate 10, a collector region 22 of the P+ type may be provided in a region where the cathode region 82 is not provided. The cathode region 82 and the collector region 22 are provided between a lower surface 23 of the semiconductor substrate 10 and a buffer region 20. In FIG. 2, a boundary between the cathode region 82 and the collector region 22 is indicated by a dotted line.

The cathode region 82 is arranged apart from the well region 11 in the Y axis direction. With this configuration, the distance between the P type region (the well region 11) having a relatively high doping concentration and formed up to the deep position, and the cathode region 82 is ensured, so that the breakdown voltage can be improved. The end portion of the cathode region 82 in the Y axis direction of the present example is arranged farther away from the well region 11 than the end portion of the contact hole 54 in the Y axis direction. In another example, the end portion in the Y axis direction of the cathode region 82 may be arranged between the well region 11 and the contact hole 54.

Figure 3:
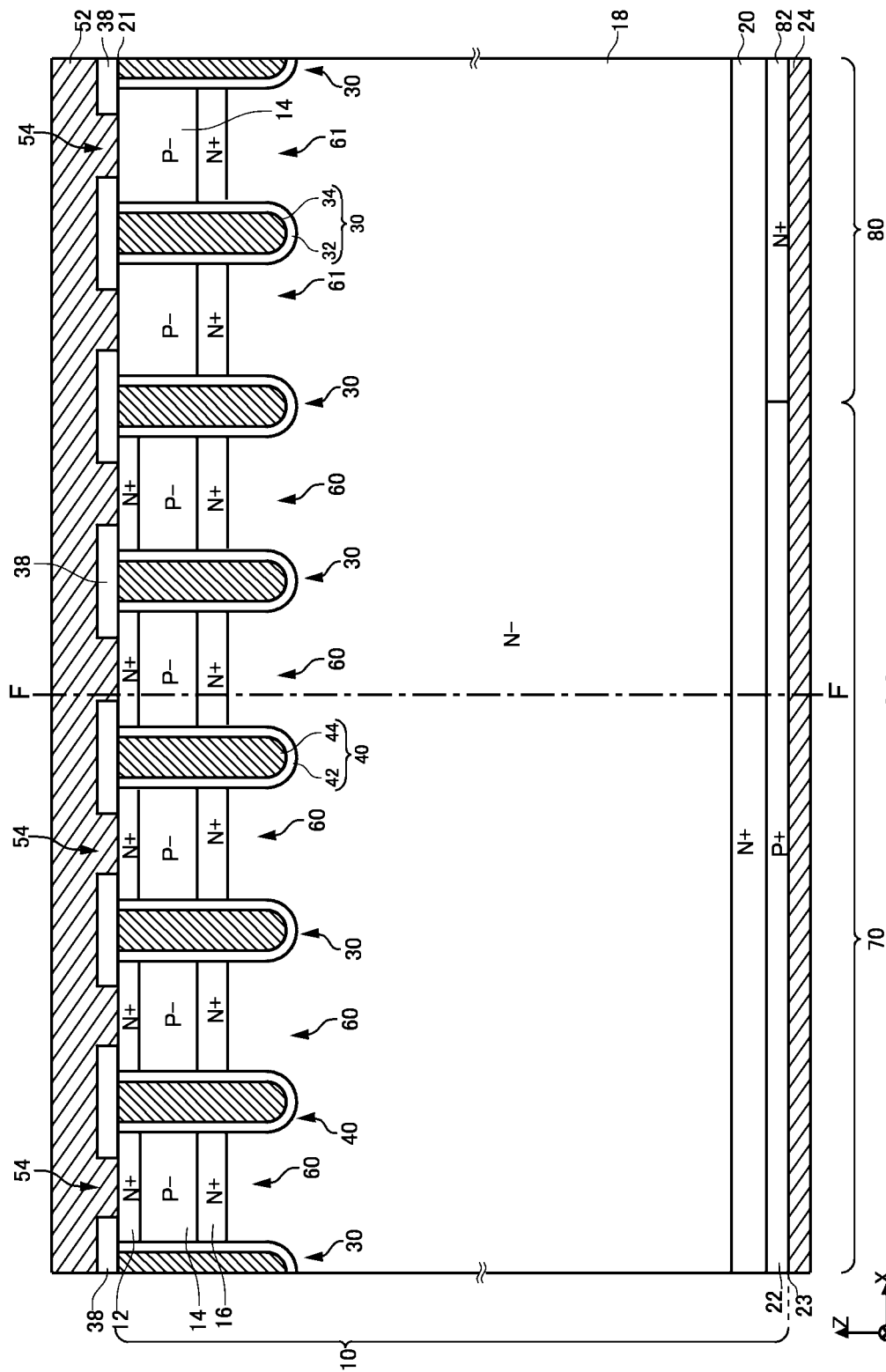
FIG. 3 is a diagram showing an example of a cross section e-e in FIG. 2.

FIG. 3 is a diagram showing an example of a cross section e-e in FIG. 2. The cross section e-e is an XZ plane passing through the emitter region 12 and the cathode region 82. The semiconductor device 100 of the present example includes the semiconductor substrate 10, the interlayer dielectric film 38, the emitter electrode 52, and the collector electrode 24 in the cross section.

The interlayer dielectric film 38 is provided on the upper surface of the semiconductor substrate 10. The interlayer dielectric film 38 is a film including at least one layer of a dielectric film such as silicate glass to which an impurity such as boron or phosphorus is added, a thermal oxide film, or other dielectric films. The interlayer dielectric film 38 is provided with the contact hole 54 described in FIG. 2.

The emitter electrode 52 is provided above the interlayer dielectric film 38. The emitter electrode 52 is in contact with an upper surface 21 of the semiconductor substrate 10 through the contact hole 54 of the interlayer dielectric film 38. The collector electrode 24 is provided on the lower surface 23 of the semiconductor substrate 10. The emitter electrode 52 and the collector electrode 24 are formed of a metal material such as aluminum. In the present specification, the direction in which the emitter electrode 52 is connected to the collector electrode 24 (the Z axis direction) is referred to as a depth direction.

The semiconductor substrate 10 has an N type or N− type drift region 18. The drift region 18 is provided in each of the transistor portion 70 and the diode portion 80.

In the mesa portion 60 of the transistor portion 70, the emitter region 12 of the N+ type and the base region 14 of the P− type are provided in order from the upper surface 21 side of the semiconductor substrate 10. The drift region 18 is provided below the base region 14. The mesa portion 60 may also be provided with an accumulation region 16 of the N+ type. The accumulation region 16 is arranged between the base region 14 and the drift region 18.

The emitter region 12 is exposed on the upper surface 21 of the semiconductor substrate 10 and is provided in contact with the gate trench portion 40. The emitter region 12 may be in contact with the trench portions on both sides of the mesa portion 60. The emitter region 12 has a higher doping concentration than the drift region 18.

The base region 14 is provided below the emitter region 12. The base region 14 of the present example is provided in contact with the emitter region 12. The base region 14 may be in contact with the trench portions on both sides of the mesa portion 60.

The accumulation region 16 is provided below the base region 14. The accumulation region 16 is an N+ type region with a higher doping concentration than the drift region 18. The accumulation region 16 may have a concentration peak of a donor such as a phosphorus or hydrogen donor. By providing the accumulation region 16 having the high concentration between the drift region 18 and the base region 14, it is possible to improve a carrier injection enhancement effect (IE effect) and reduce an on-voltage. The accumulation region 16 may be provided to cover a whole lower surface of the base region 14 in each mesa portion 60.

The mesa portion 61 of the diode portion 80 is provided with the P− type base region 14 in contact with the upper surface 21 of the semiconductor substrate 10. The drift region 18 is provided below the base region 14. In the mesa portion 61, the accumulation region 16 may be provided below the base region 14.

In each of the transistor portion 70 and the diode portion 80, the N+ type buffer region 20 may be provided below the drift region 18. The doping concentration of the buffer region 20 is higher than the doping concentration of the drift region 18. The buffer region 20 may have a concentration peak having a doping concentration higher than that of the drift region 18. The doping concentration of the concentration peak indicates a doping concentration at an apex of the concentration peak. Further, as the doping concentration of the drift region 18, an average value of doping concentrations in the region where the doping concentration distribution is substantially flat may be used.

The buffer region 20 may be formed by implanting ions of the N type dopant such as hydrogen (proton) or phosphorus. The buffer region 20 of the present example is formed by implanting hydrogen ions. The buffer region 20 may function as a field stop layer which prevents a depletion layer expanding from the lower end of the base region 14 from reaching the P+ type collector region 22 and the N+ type cathode region 82.

In the transistor portion 70, the P+ type collector region 22 is provided below the buffer region 20. An acceptor concentration of the collector region 22 is higher than an acceptor concentration of the base region 14. The collector region 22 may include an acceptor which is the same as or different from an acceptor of the base region 14. The acceptor of the collector region 22 is, for example, boron.

Below the buffer region 20 in the diode portion 80, the N+ type cathode region 82 is provided. A donor concentration of the cathode region 82 is higher than a donor concentration of the drift region 18. A donor of the cathode region 82 is, for example, hydrogen or phosphorus. Note that an element serving as a donor and an acceptor in each region is not limited to the above-described example. The collector region 22 and the cathode region 82 are exposed on the lower surface 23 of the semiconductor substrate 10 and are connected to the collector electrode 24. The collector electrode 24 may be in contact with the entire lower surface 23 of the semiconductor substrate 10. The emitter electrode 52 and the collector electrode 24 are formed of a metal material such as aluminum.

One or more gate trench portions 40 and one or more dummy trench portions 30 are provided on the upper surface 21 side of the semiconductor substrate 10. Each trench portion penetrates through the base region 14 from the upper surface 21 of the semiconductor substrate 10, and reaches the drift region 18. In a region where at least any one of the emitter region 12, the contact region 15, or the accumulation region 16 is provided, each trench portion also penetrates through these doping regions to reach the drift region 18. The configuration of the trench portion penetrating the doping region is not limited to the one manufactured in the order of forming the doping region and then forming the trench portion. The configuration of the trench portion penetrating the doping region also includes a configuration of the doping region being formed between the trench portions after forming the trench portion.

As described above, the transistor portion 70 is provided with the gate trench portion 40 and the dummy trench portion 30. In the diode portion 80, the dummy trench portion 30 is provided, and the gate trench portion 40 is not provided. The boundary in the X axis direction between the diode portion 80 and the transistor portion 70 in the present example is the boundary between the cathode region 82 and the collector region 22.

The gate trench portion 40 includes a gate trench provided in the upper surface 21 of the semiconductor substrate 10, a gate dielectric film 42, and a gate conductive portion 44. The gate dielectric film 42 is provided to cover the inner wall of the gate trench. The gate dielectric film 42 may be formed by oxidizing or nitriding a semiconductor on the inner wall of the gate trench. The gate conductive portion 44 is provided inside from the gate dielectric film 42 in the gate trench. That is, the gate dielectric film 42 insulates the gate conductive portion 44 from the semiconductor substrate 10. The gate conductive portion 44 is formed of a conductive material such as polysilicon.

The gate conductive portion 44 may be provided longer than the base region 14 in the depth direction. The gate trench portion 40 in the cross section is covered by the interlayer dielectric film 38 on the upper surface 21 of the semiconductor substrate 10. The gate conductive portion 44 is electrically connected to the gate runner. When a predetermined gate voltage is applied to the gate conductive portion 44, a channel is formed by an electron inversion layer in a surface layer of the base region 14 at a boundary in contact with the gate trench portion 40.

The dummy trench portions 30 may have the same structure as the gate trench portions 40 in the cross section. The dummy trench portion 30 includes a dummy trench provided in the upper surface 21 of the semiconductor substrate 10, a dummy dielectric film 32, and a dummy conductive portion 34. The dummy conductive portion 34 is electrically connected to the emitter electrode 52. The dummy dielectric film 32 is provided covering an inner wall of the dummy trench. The dummy conductive portion 34 is provided in the dummy trench, and is provided inside the dummy dielectric film 32. The dummy dielectric film 32 insulates the dummy conductive portion 34 from the semiconductor substrate 10. The dummy conductive portion 34 may be formed of the same material as the gate conductive portion 44. For example, the dummy conductive portion 34 is formed of a conductive material such as polysilicon or the like. The dummy conductive portion 34 may have the same length as the gate conductive portion 44 in the depth direction.

The gate trench portion 40 and the dummy trench portion 30 of the present example are covered with the interlayer dielectric film 38 on the upper surface 21 of the semiconductor substrate 10. Note that the bottom portions of the dummy trench portion 30 and the gate trench portion 40 may be formed in a curved-surface shape (a curved-line shape in the cross section) convexly downward.

Figure 4A:
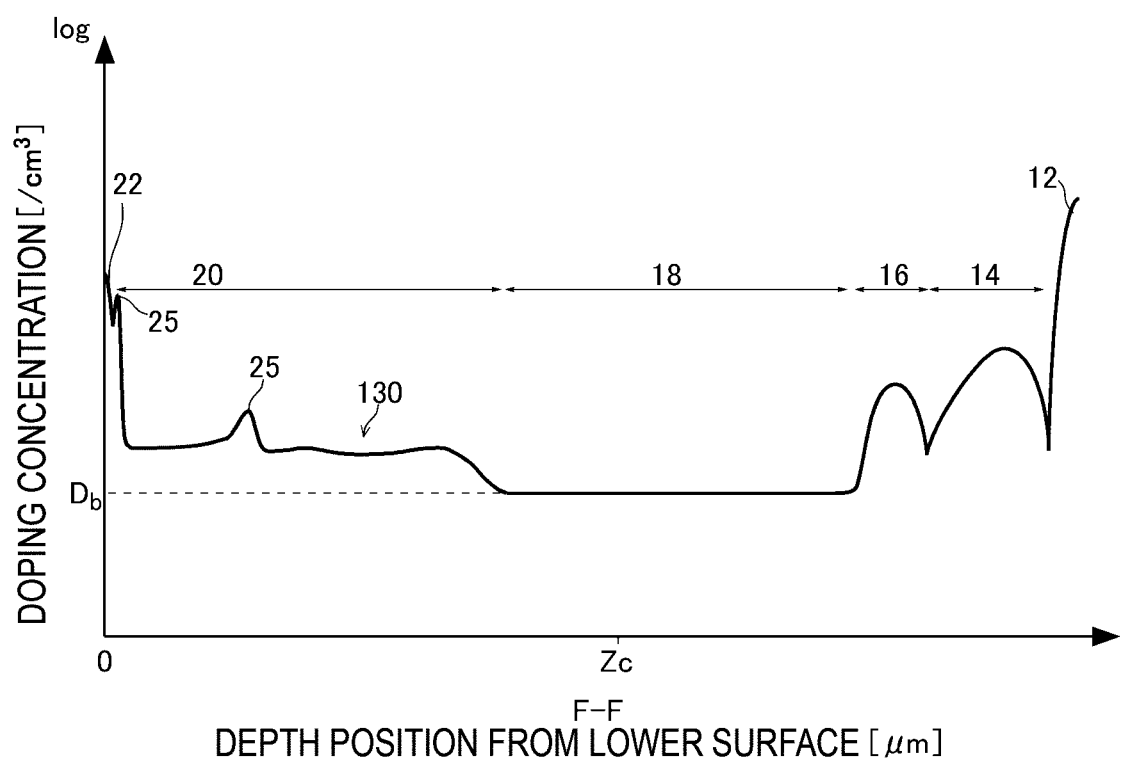
FIG. 4A is a diagram showing an example of a doping concentration distribution in a depth direction, at a position of a line F-F in FIG. 3.

FIG. 4A is a diagram showing an example of a doping concentration distribution in the depth direction, at a position of a line F-F in FIG. 3. A vertical axis in FIG. 4A is a logarithmic axis. In FIG. 4A, the center position of the semiconductor substrate 10 in the depth direction is represented by Zc.

The emitter region 12 has a concentration peak of an N type dopant. The N type dopant is, for example, phosphorus, but it is not limited thereto. The base region 14 has a concentration peak of a P type dopant. The P type dopant is, for example, boron, but it is not limited thereto. The accumulation region 16 has a concentration peak of an N type dopant. The N type dopant is, for example, hydrogen or phosphorus, but it is not limited thereto.

In the drift region 18, the doping concentration may substantially be constant. The doping concentration of the drift region 18 may be the same as the bulk donor concentration $D_b$, or may be higher than the bulk donor concentration $D_b$.

The buffer region 20 is an N type region having a higher doping concentration than the bulk donor concentration $D_b$. The doping concentration of the buffer region 20 may be higher than that of the drift region 18. The buffer region 20 is at least partially provided on the lower surface 23 side of the semiconductor substrate 10. The lower surface 23 side is a region between the lower surface 23 and the center position Zc. The doping concentration distribution in the buffer region 20 of the present example may include a concentration peak 25. The buffer region 20 may include a plurality of concentration peaks 25 provided at different positions in the depth direction.

The buffer region 20 includes a flat region 130. The flat region 130 may be arranged between the concentration peak 25 and the drift region 18. The flat region 130 is a region where the doping concentration is substantially constant.

Figure 4B:
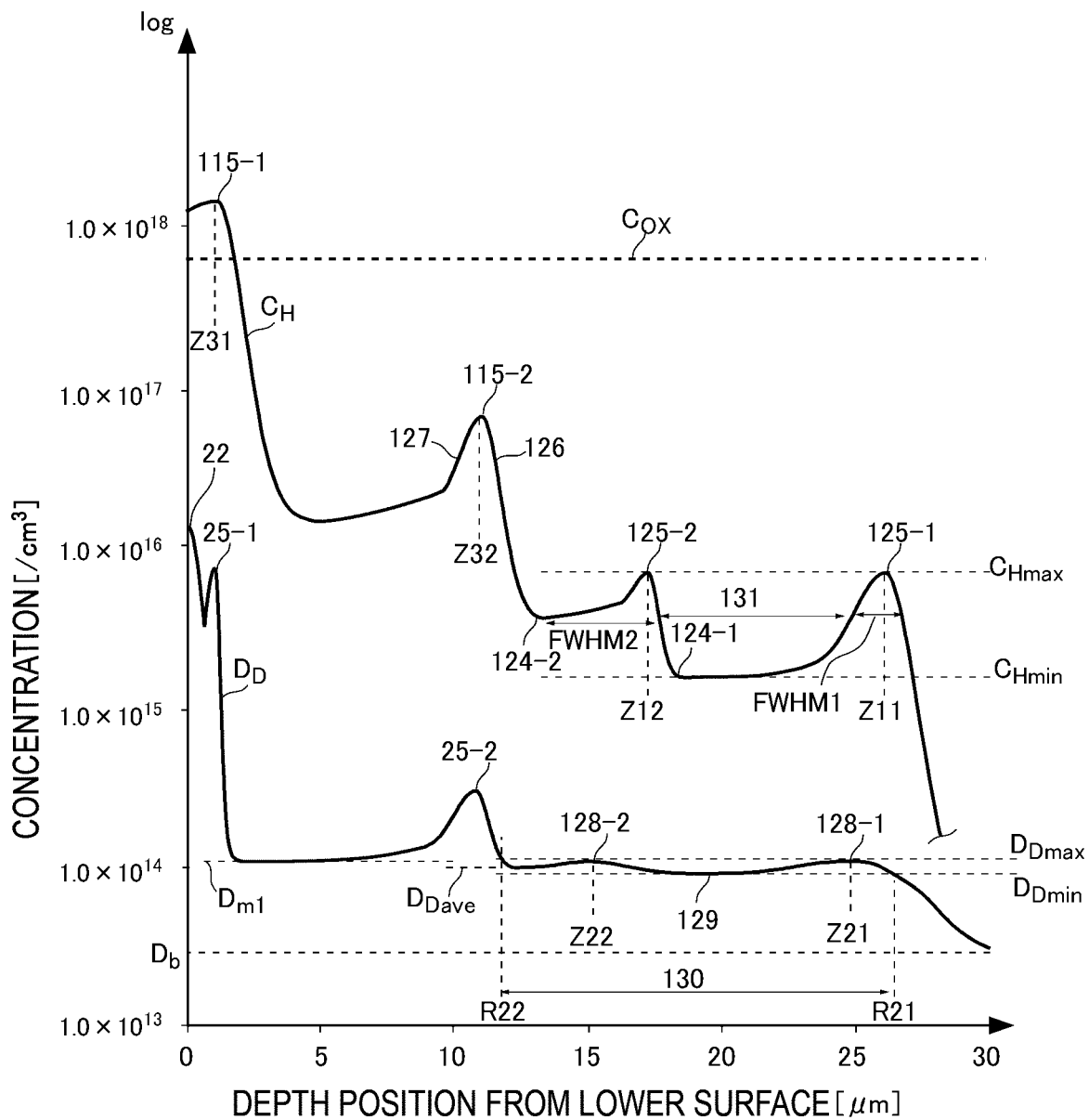
FIG. 4B is a diagram showing a distribution example of a doping concentration $D_D$ and a hydrogen chemical concentration $C_H$ in a buffer region 20, in the depth direction.

FIG. 4B is a diagram showing a distribution example of a doping concentration $D_D$ and a hydrogen chemical concentration $C_H$ in the buffer region 20, in the depth direction. The semiconductor substrate 10 of the present example includes a bulk donor and oxygen. In FIG. 4B, the bulk donor concentration is represented by $D_b$, and the oxygen chemical concentration is represented by $C_{ox}$. The bulk donor concentration $D_b$ may be uniform in the depth direction of the semiconductor substrate 10. The oxygen chemical concentration $C_{OX}$ may be uniform in the depth direction of the semiconductor substrate 10, may increase monotonically, or may decrease monotonically. The oxygen chemical concentration $C_{OX}$ may be $1.0\times10^{17}$ atoms/cm$^3$ or more, $3.0\times10^{17}$ atoms/cm$^3$ or more, $5.0\times10^{17}$ atoms/cm$^3$ or more, or $7.0\times10^{17}$ atoms/cm$^3$ or more. The oxygen chemical concentration $C_{OX}$ may be $3.0\times10^{18}$ atoms/cm$^3$ or less, $2.0\times10^{18}$ atoms/cm$^3$ or less, or $1.0\times10^{18}$ atoms/cm$^3$ or less.

Note that oxygen near the front surface of the semiconductor substrate 10 may be emitted toward the outside of the semiconductor substrate 10. Therefore, near the front surface of the semiconductor substrate 10, the oxygen chemical concentration $C_{OX}$ may be smaller than $1.0\times10^{17}$ atoms/cm$^3$. As the oxygen chemical concentration $C_{OX}$, an average value of the oxygen chemical concentrations $C_{OX}$ in the entire semiconductor substrate 10 may be used. In another example, the oxygen chemical concentration in the buffer region 20 may be used as the oxygen chemical concentration $C_{OX}$. For example a minimum value of the oxygen chemical concentration in the buffer region 20 may be used as the oxygen chemical concentration $C_{OX}$. As the oxygen chemical concentration $C_{OX}$, the oxygen chemical concentration in the flat region 130 may also be used. For example, a minimum value of the oxygen chemical concentration in the flat region 130 may be used as the oxygen chemical concentration $C_{OX}$.

The buffer region 20 of the present example is formed by implanting hydrogen ions from the lower surface 23 of the semiconductor substrate 10. The doping concentration $D_D$ of the buffer region 20 may be a sum of the hydrogen donor concentration and the bulk donor concentration $D_b$.

The hydrogen ions are implanted in the vicinity of the apex of the concentration peak 25 and into the flat region 130. Apart of the hydrogen ions may be implanted between the flat region 130 and the drift region 18. In the present example, the hydrogen ions are implanted at each of depth positions Z11, Z12, Z32, and Z31 in the buffer region 20. A peak of the hydrogen chemical concentration $C_H$ is formed at each of the depth positions Z11, Z12, Z32, and Z31. The distances of the depth positions Z11, Z12, Z32, and Z31 from the lower surface 23 are large from small in this order.

In the present example, of the peaks of the hydrogen chemical concentration $C_H$, a peak at which a hydrogen ion dosage is equal to or smaller than a predetermined value is given as a low-concentration hydrogen peak 125. Further, a peak at which the hydrogen ion dosage is larger than the predetermined value is given as a high-concentration hydrogen peak 115. Furthermore, the low-concentration hydrogen peak and the high-concentration hydrogen peak may collectively be referred to as a hydrogen peak. The predetermined value described above is $1.0\times10^{12}$ ions/cm$^2$. The predetermined value may be $5.0\times10^{11}$ ions/cm$^2$. As the hydrogen ion dosage at the hydrogen peak, a value obtained by integrating the hydrogen chemical concentrations $C_H$ across a range of the full width at half maximum of the hydrogen peak may be used. Further, the hydrogen ion dosage with respect to the low-concentration hydrogen peak 125 may be $1.0\times10^{10}$ ions/cm$^2$ or more, or may be $1.0\times10^{11}$ ions/cm$^2$ or more. The hydrogen ion dosage with respect to the low-concentration hydrogen peak 125 may be $5.0\times10^{12}$ ions/cm$^2$ or less, $3.0\times10^{12}$ ions/cm$^2$ or less, or $2.0\times10^{12}$ ions/cm$^2$ or less. When the oxygen chemical concentration is, for example, $5.0\times10^7$ atoms/cm$^3$ or more, the hydrogen ion dosage with respect to the low-concentration hydrogen peak 125 may be $3.0\times10^{12}$ ions/cm$^2$ or more and $1.0\times10^{13}$ ions/cm$^2$ or less.

Further, of the peaks of the hydrogen chemical concentration $C_H$, a peak at which the hydrogen chemical concentration $C_H$ at an apex is equal to or smaller than a predetermined value may be given as the low-concentration hydrogen peak 125. A peak at which the hydrogen chemical concentration $C_H$ at the apex is larger than the predetermined value may be given as the high-concentration hydrogen peak 115. The predetermined value described above is $1.0\times10^{16}$ atoms/cm$^3$. The predetermined value may be $5.0\times10^{15}$ atoms/cm$^3$. Further, the hydrogen chemical concentration $C_H$ at the apex of the low-concentration hydrogen peak 125 may be $1.0\times10^{14}$ atoms/cm$^3$ or more or $1.0\times10^5$ atoms/cm$^3$ or more.

The buffer region 20 includes a first low-concentration hydrogen peak 125-1 and a second low-concentration hydrogen peak 125-2. The first low-concentration hydrogen peak 125-1 of the present example is arranged at the depth position Z11. The second low-concentration hydrogen peak 125-2 of the present example is arranged at the depth position Z12. That is, the second low-concentration hydrogen peak 125-2 is arranged at a position closer to the lower surface 23 than the first low-concentration hydrogen peak 125-1, in the buffer region 20. In the present specification, the position of the apex of each of the hydrogen peaks is referred to as the depth position of the hydrogen peak. In the present example, the hydrogen ion implantation position and the apex position of the hydrogen peak are the same.

The buffer region 20 may include one or more high-concentration hydrogen peaks 115. The buffer region 20 of the present example includes a first high-concentration hydrogen peak 115-1 and a second high-concentration hydrogen peak 115-2. The first high-concentration hydrogen peak 115-1 of the present example is arranged at the depth position Z31. The second high-concentration hydrogen peak 115-2 of the present example is arranged at the depth position Z32. Of the hydrogen peaks formed in the buffer region 20, the first low-concentration hydrogen peak 125-1 of the present example is a peak arranged closest to the upper surface 21. Further, of the hydrogen peaks formed in the buffer region 20, the first high-concentration hydrogen peak 115-1 of the present example is a peak arranged closest to the lower surface 23.

When the hydrogen ions are implanted from the lower surface 23, hydrogen is also distributed in a region from the implantation position to the lower surface 23. Therefore, a gradient of a lower surface side tail 127 that extends from the apex of each hydrogen peak toward the lower surface 23 becomes gradual, and a gradient of an upper surface side tail 126 that extends from the apex of the hydrogen peak toward the upper surface 21 becomes more precipitous than the lower surface side tail 127.

When charged particles of hydrogen ions or the like are irradiated into the semiconductor substrate 10, lattice defects mainly composed of vacancies such as atomic vacancy (V) and divacancy (VV) are formed in a passed-through region through which the charged particles have passed, due to the charged particles passing through the region. In the present example, the lattice defects are formed in a region from the lower surface 23 of the semiconductor substrate 10 to the vicinity of the apex of the first low-concentration hydrogen peak 125-1. Atoms adjacent to the vacancies have dangling bonds. Lattice defects also include interstitial atoms, dislocations, and the like, and may include donors and acceptors in a broad sense. However, in the present specification, lattice defects mainly composed of vacancies may be referred to as vacancy-type lattice defects, vacancy-type defects, or simply lattice defects. In addition, since many lattice defects are formed by implantation of charged particles into the semiconductor substrate 10, the crystallinity of the semiconductor substrate 10 may be strongly disturbed. In the present specification, this disturbance of crystallinity may be referred to as disorder.

In addition, oxygen is contained in the entire semiconductor substrate 10. The oxygen is introduced intentionally or unintentionally during manufacturing of a semiconductor ingot. By hydrogen implanted into the buffer region 20 being diffused by heat treatment or the like, hydrogen (H), vacancy (V), and oxygen (O) are coupled to form a VOH defect inside the semiconductor substrate 10.

The VOH defect functions as a donor that supplies electrons. In the present specification, VOH defects may be referred to simply as hydrogen donors. By forming the hydrogen donors in the semiconductor substrate 10, the buffer region 20 having a higher concentration than the drift region 18 can be formed.

Since a large amount of hydrogen and lattice defects exist in the vicinity of the hydrogen ion implantation position, many hydrogen donors are likely to be formed. Therefore, the concentration peak 25 may be formed in the vicinity of the implantation position in the distribution of the doping concentration $D_D$.

By forming the concentration peak 25 in the buffer region 20, a situation where the depletion layer that expands from the upper surface 21 side reaches the collector region 22 or the like can be suppressed. On the other hand, although the hydrogen ions are implanted to form the hydrogen donors in the passed-through region, there may be a case where it is not desired to form a large concentration peak 25 in the vicinity of the hydrogen ion implantation position. For example, when a large concentration peak 25 is formed near the drift region 18, a voltage or current waveform may oscillate when the depletion layer reaches the concentration peak 25 during turn-off of the semiconductor device 100 or the like.

In the present example, the plurality of low-concentration hydrogen peaks 125 are formed in the buffer region 20. Accordingly, it is possible to prevent a large concentration peak 25 from being formed in the vicinity of the low-concentration hydrogen peak 125 while forming the buffer region 20 having a higher concentration than the bulk donor concentration.

The buffer region 20 of the present example includes the flat region 130. The flat region 130 includes a region 131 between the first low-concentration hydrogen peak 125-1 and the second low-concentration hydrogen peak 125-2 and a region in which the second low-concentration hydrogen peak 125-2 is provided. The flat region 130 may further include at least a part of a region where the first low-concentration hydrogen peak 125-1 is provided. Since the high-concentration hydrogen peak 115 is not provided in the flat region 130, a large concentration peak 25 is not formed.

The first low-concentration hydrogen peak 125-1 of the present example is a low-concentration hydrogen peak arranged closest to the upper surface 21 out of the plurality of low-concentration hydrogen peaks 125 arranged consecutively in the depth direction. Further, the second low-concentration hydrogen peak 125-2 is a low-concentration hydrogen peak arranged closest to the lower surface 23 out of the plurality of low-concentration hydrogen peaks 125 arranged consecutively in the depth direction. One or more low-concentration hydrogen peaks 125 may be formed between the first low-concentration hydrogen peak 125-1 and the second low-concentration hydrogen peak 125-2.

The region 131 may be a region between a full width at half maximum FWHM1 of the first low-concentration hydrogen peak 125-1 and a full width at half maximum FWHM2 of the second low-concentration hydrogen peak 125-2. The region 131 may alternatively be a region between the position Z11 of the apex of the first low-concentration hydrogen peak 125-1 and the position Z12 of the apex of the second low-concentration hydrogen peak 125-2.

The region where the second low-concentration hydrogen peak 125-2 is provided may be a region of the full width at half maximum FWHM2 of the second low-concentration hydrogen peak 125-2, or may be a region between two valley portions 124 sandwiching the second low-concentration hydrogen peak 125-2 in the depth direction. The valley portion 124-1 is where the hydrogen chemical concentration $C_H$ first becomes a local minimum value in a direction from the position Z12 to the upper surface 21. The valley portion 124-2 is where the hydrogen chemical concentration $C_H$ first becomes a local minimum value in a direction from the position Z12 to the lower surface 23. The region where the first low-concentration hydrogen peak 125-1 is provided may be a region of the full width at half maximum FWHM1 of the first low-concentration hydrogen peak 125-1.

In the flat region 130, the doping concentration $D_D$ is higher than the bulk donor concentration $D_b$, and a variation of the doping concentration $D_D$ is ±30% or less. An average value of the doping concentrations $D_D$ in the flat region 130 is represented by $D_{Dave}$, a maximum value is represented by $D_{Dmax}$, and a minimum value is represented by $D_{Dmin}$. The maximum value $D_{Dmax}$ may be 1.3 times or less of the average value $D_{Dave}$. The minimum value $D_{Dmin}$ may be 0.7 times or more of the average value $D_{Dave}$.

The doping concentration distribution of the flat region 130 in the depth direction may include one or more concentration peaks 128. The concentration peak 128 is where the doping concentration $D_D$ becomes a local maximum value. An amplitude of the concentration peak 128 is smaller than an amplitude of the concentration peak 25. Each of the concentration peaks 128 corresponds to any of the low-concentration hydrogen peaks 125. The flat region 130 of the present example includes a first concentration peak 128-1 corresponding to the first low-concentration hydrogen peak 125-1 and a second concentration peak 128-2 corresponding to the second low-concentration hydrogen peak 125-2. Each of the concentration peaks 128 may be arranged within a range of the full width at half maximum FWHM of the corresponding low-concentration hydrogen peak 125.

Further, the flat region 130 may include one or more local minimum portions 129. The local minimum portion 129 is where the doping concentration $D_D$ becomes a local minimum value. Each of the local minimum portions 129 corresponds to the valley portion 124 of the hydrogen chemical concentration $C_H$. In the present example, the local minimum portion 129 corresponding to the valley portion 124-1 is arranged between the first concentration peak 128-1 and the second concentration peak 128-2.

The concentration of the concentration peak 128 changes more gradually in the depth direction than that of the corresponding low-concentration hydrogen peak 125. For example, a gradient of the change of the doping concentration $D_D$ from the concentration peak 128-2 to the local minimum portion 129 is smaller than a gradient of the change of the hydrogen chemical concentration $C_H$ from the second low-concentration hydrogen peak 125-2 to the valley portion 124-1.

When calculating the average value $D_{Dave}$ of the doping concentrations in the flat region 130, a range of the depth position from the lower surface 23 may be defined as follows. A position of an edge on the upper surface 21 side of the flat region 130, for which the average value is to be calculated, is given as R21, and a position on the lower surface 23 side is given as R22. The position R21 may be a position at which a value of the doping concentration becomes the same as that of the doping concentration of the local minimum portion 129 between the concentration peak 128-1 and the concentration peak 128-2, the position R21 being closer to the upper surface 21 than the position Z21. The position R22 may be a position at which a value of the doping concentration at a tail on the upper surface 21 side of the concentration peak 25-2 becomes the same as that of the doping concentration at the position Z22 of the concentration peak 128-2. As the average value $D_{Dave}$ of the doping concentrations in the flat region 130, a value obtained by dividing a value, which is obtained by integrating the doping concentrations across from the position R21 to the position R22, by a length between the position R21 and the position R22, may be used.

The doping concentration distribution between the concentration peak 25-1 and the concentration peak 25-2 may include a local minimum value $D_{m1}$. The average value $D_{Dave}$ of the flat region 130 may be equal to or smaller than the local minimum value $D_{m1}$, or may be smaller than the local minimum value $D_{m1}$. The maximum value $D_{Dmax}$ of the flat region 130 may be equal to or larger than the local minimum value $D_{m1}$, may be equal to or smaller than the local minimum value $D_{m1}$, or may be smaller than the local minimum value $D_{m1}$.

A peak width of the concentration peak 128 of the doping concentration distribution in the flat region 130 may be larger than a peak width of the corresponding low-concentration hydrogen peak 125 of the hydrogen chemical concentration distribution. The peak width of the concentration peak 128 of the doping concentration distribution in the flat region 130 may be a distance between the local minimum portion on the upper surface 21 side of the concentration peak 128 and the local minimum portion on the lower surface 23 side. In the flat region 130, the maximum value $D_{Dmax}$ of the doping concentration may be 50% or more of the minimum value $D_{Dmin}$. In this case, the concentration of the local minimum portion 129 becomes 50% or more of the maximum value $D_{Dmax}$, and the full width at half maximum FWHM of the concentration peak 128 cannot be defined. When the full width at half maximum FWHM of the concentration peak 128 can be defined, the full width at half maximum FWHM may be used as the peak width of the concentration peak 128.

Further, a highest hydrogen chemical concentration $C_H$ out of the hydrogen chemical concentrations $C_H$ of the low-concentration hydrogen peak 125 is given as $C_{Hmax}$. A lowest hydrogen chemical concentration $C_H$ out of the hydrogen chemical concentrations $C_H$ of the valley portion 124 sandwiched by the low-concentration hydrogen peaks 125 is given as $C_{Hmin}$. A ratio of the hydrogen chemical concentration $C_{Hmax}$ to the hydrogen chemical concentration $C_{Hmin}$, that is, a ratio $C_{Hmax}/C_{Hmin}$, is given as a variation ratio R1. Similarly, a ratio of the maximum value $D_{Dmax}$ to the minimum value $D_{Dmin}$ of the doping concentration $D_D$ in the flat region 130, that is, a ratio $D_{Dmax}/D_{Dmin}$, is given as a variation ratio R2. The variation ratio R2 is smaller than the variation ratio R1. The variation ratio R2 may be half or less, 1/4 or less, or 1/10 or less of the variation ratio R1.

The semiconductor substrate 10 of the present example has a relatively high oxygen chemical concentration $C_{OX}$. Further, the hydrogen chemical concentration becomes relatively low in a region where the low-concentration hydrogen peak 125 is arranged. Therefore, the hydrogen donor concentration in the region where the low-concentration hydrogen peak 125 is arranged is affected by the oxygen chemical concentration $C_{OX}$, resulting in a small variation. Accordingly, the flat region 130 that has a higher concentration than the bulk donor concentration $D_b$ and in which the variation of the doping concentration $D_D$ is small can be formed in the region where the low-concentration hydrogen peak 125 is arranged.

The hydrogen donor concentration $N_{VOH}$ may be expressed by the following Expression 1 using a vacancy concentration $N_V$ caused by the hydrogen ions passing through, the oxygen chemical concentration $C_{OX}$ of the semiconductor substrate 10, and an oxygen contribution ratio $\xi$ (which is a ratio at which the oxygen chemical concentration $C_{OX}$ actually contributes to generation of $N_{VOH}$.

$$N_{VOH}=N_V+\xi C_{OX} \quad \text{(Expression 1)}$$

The oxygen contribution ratio $\xi$ may be $1\times10^{-5}$ or more and $1\times10^{-3}$ or less. The vacancy concentration $N_V$ may be $1\times10^{12}$ (/cm$^3$) or more and $1\times10^{14}$ (/cm$^3$) or less. The oxygen contribution ratio $\xi$ may be expressed by the following Expression 2 with respect to a dosage $D_H$(ions/cm$^2$) of the low-concentration hydrogen peak 125-1 farthest from the lower surface 23.

$$\xi=aD_H^b \quad \text{(Expression 2)}$$

Herein, a may be $1\times10^{-11}$ or more and $1\times10^{-10}$ or less. b may be $4\times10^{-1}$ or more and $6\times10^{-1}$ or less.

The semiconductor substrate 10 of the present example has a relatively high carbon chemical concentration $C_C$. The hydrogen donor concentration $N_{VOH}$ may be expressed by the following Expression 2 using the vacancy concentration $N_V$ caused by the hydrogen ions passing through, the oxygen chemical concentration $C_{OX}$ of the semiconductor substrate 10, the oxygen contribution ratio $\xi$ which is the ratio at which the oxygen chemical concentration $C_{OX}$ actually contributes to generation of $N_{VOH}$, the carbon chemical concentration $C_C$ of the semiconductor substrate 10, and a carbon contribution ratio $\eta$ which is a ratio at which the carbon chemical concentration $C_C$ actually contributes to generation of $N_{VOH}$.

$$N_{VOH}=N_V+\xi C_{OX}+\eta C_C \quad \text{(Expression 2)}$$

The oxygen contribution ratio $\xi$ and the vacancy concentration $N_V$ may be within the ranges of the values described above. The carbon contribution ratio $\eta$ may be a value from 0.01% to 10% (that is, 0.0001 or more and 0.1 or less).

Each of the concentration peaks 128 may be arranged closer to the lower surface 23 of the semiconductor substrate 10 than the corresponding low-concentration hydrogen peak 125. In the present example, the first concentration peak 128-1 is arranged closer to the lower surface 23 than the first low-concentration hydrogen peak 125-1, and the second concentration peak 128-2 is arranged closer to the lower surface 23 than the second low-concentration hydrogen peak 125-2. The depth position of the first concentration peak 128-1 is the depth position Z21 at which the doping concentration $D_D$ shows the local maximum value, and the depth position of the second concentration peak 128-2 is the depth position Z22 at which the doping concentration $D_D$ shows the local maximum value.

The distribution of the doping concentration $D_D$ shown in FIG. 4B is a carrier concentration measured by the SRP method. In the present example, the hydrogen chemical concentration $C_H$ in the low-concentration hydrogen peak 125 is low. On the other hand, a relatively large number of lattice defects are formed at the depth positions Z11 and Z12 at which the hydrogen ions are implanted. Therefore, many lattice defects that are not coupled with hydrogen may remain in the vicinity of the depth positions Z11 and Z12. Due to the presence of many lattice defects, the carrier concentration in the vicinity of the depth positions Z11 and Z12 may become low. Further, the gradient of the lower surface side tail 127 of each of the hydrogen peaks is smaller than that of the upper surface side tail 126. Therefore, a larger amount of hydrogen ions exist on the lower surface 23 side of the depth positions Z11 and Z12 than on the upper surface 21 side. A relatively large amount of hydrogen donors are likely to be formed on the lower surface 23 side of the depth positions Z11 and Z12. Therefore, the concentration peak 128 may be arranged closer to the lower surface 23 than the low-concentration hydrogen peak 125. In the flat region 130, the carrier concentration measured by the SRP method may differ by about ±10% from the carrier concentrations at adjacent measurement points, and thus it may appear as if the measured carrier concentration varies for each measurement point. In such a case, as an example, an average value obtained by averaging measurement values obtained at a total of three measurement points, that is, the carrier concentration at the measurement point and the carrier concentrations at the measurement points before and after the measurement point, may be used as the carrier concentration of the measurement point, or an average value of measurement values at a plurality of points before and after the measurement point, such as two points before and after the measurement point, may be used.

The length of the flat region 130 in the depth direction of the semiconductor substrate 10 may be smaller than half the length of the buffer region 20, or may be half or more. The length of the flat region 130 can be adjusted based on the number, intervals, or the like of the low-concentration hydrogen peaks 125.

The average value $D_{Dave}$ of the doping concentrations in the flat region 130 may be 0.01% or more and 3% or less of the oxygen chemical concentration $C_{OX}$ of the semiconductor substrate 10. The average value $D_{Dave}$ may be 0.05% or more or 0.1% or more of the oxygen chemical concentration $C_{OX}$. The average value $D_{Dave}$ may be 2% or less or 1% or less of the oxygen chemical concentration $C_{OX}$. The average value $D_{Dave}$ of the doping concentrations in the flat region 130 depends on the hydrogen ion dosage of the low-concentration hydrogen peaks 125. By implanting the hydrogen ions so as to satisfy the conditions described above, it becomes easy to form the flat region 130.

The oxygen chemical concentration $C_{OX}$ of the semiconductor substrate 10 may be 10 times or more of the hydrogen chemical concentration of the first low-concentration hydrogen peak 125-1. That is, the hydrogen chemical concentration of the first low-concentration hydrogen peak 125-1 may be 10% or less of the oxygen chemical concentration $C_{OX}$ of the semiconductor substrate 10. Accordingly, an effect of the oxygen chemical concentration $C_{OX}$ on the doping concentration $D_D$ of the flat region 130 is enhanced, and thus it becomes easy to planarize the doping concentration distribution of the flat region 130. In the present example, the oxygen chemical concentration $C_{OX}$ and the hydrogen chemical concentration at the depth position Z11 may be compared. The oxygen chemical concentration $C_{OX}$ of the semiconductor substrate 10 may be 20 times or more, 50 times or more, or 100 times or more of the hydrogen chemical concentration of the first low-concentration hydrogen peak 125-1. Note that regarding the first low-concentration hydrogen peak 125-1, the same holds true for other low-concentration hydrogen peaks 125.

The interval between the first low-concentration hydrogen peak 125-1 and the second low-concentration hydrogen peak 125-2, that is, Z11-Z12 (µm), may be $3/10^{16}$ (µm/(atoms/cm$^3$)) times or less of the oxygen chemical concentration $C_{OX}$ (atoms/cm$^3$) of the semiconductor substrate 10. The interval Z11-Z12 of the present example is an interval between the adjacent low-concentration hydrogen peaks 125 in the depth direction. For example, when the oxygen chemical concentration $C_{OX}$ is $1.0 \times 10^{17}$ atoms/cm$^3$, the interval Z11-Z12 is 30 µm or less. The interval Z11-Z12 (µm) may be $1/10^{16}$ (µm/(atoms/cm$^3$)) times or less or $5/10^{17}$ (µm/(atoms/cm$^3$)) times or less of the oxygen chemical concentration $C_{OX}$ (atoms/cm$^3$).

The hydrogen chemical concentration $C_H$ of the first low-concentration hydrogen peak 125-1 may be $1.0 \times 10^{16}$ atoms/cm$^3$ or less. The hydrogen chemical concentration $C_H$ of other low-concentration hydrogen peaks 125 may also be $1.0 \times 10^{16}$ atoms/cm$^3$ or less. The interval Z11-Z12 may be 100 µm or less, 50 µm or less, 20 µm or less, or 10 µm or less. When the interval Z11-Z12 between the adjacent low-concentration hydrogen peaks 125 is too large, the hydrogen chemical concentration $C_H$ of the valley portion 124 becomes too low, and the doping concentration of the local minimum portion 129 becomes low. The interval Z11-Z12 may be 5 µm or more.

The doping concentration $D_D$ of the flat region 130 may be twice or more of the bulk donor concentration $D_b$. As the doping concentration $D_D$ of the flat region 130, the minimum value $D_{Dmin}$ or the average value $D_{Dave}$ may be used. The doping concentration $D_D$ of the flat region 130 may be 5 times or more or 10 times or more of the bulk donor concentration $D_b$.

The doping concentration $D_D$ of the flat region 130 may be $0.7 \times 10^{13}$/cm$^3$ or more. The minimum value $D_{Dmin}$ or the average value $D_{Dave}$ may be used. The doping concentration $D_D$ of the flat region 130 may be $1.0 \times 10^{14}$/cm$^3$ or more. The doping concentration $D_D$ of the flat region 130 may be $1.0 \times 10^{15}$/cm$^3$ or less or $3.0 \times 10^{14}$/cm$^3$ or less.

Figure 5A:
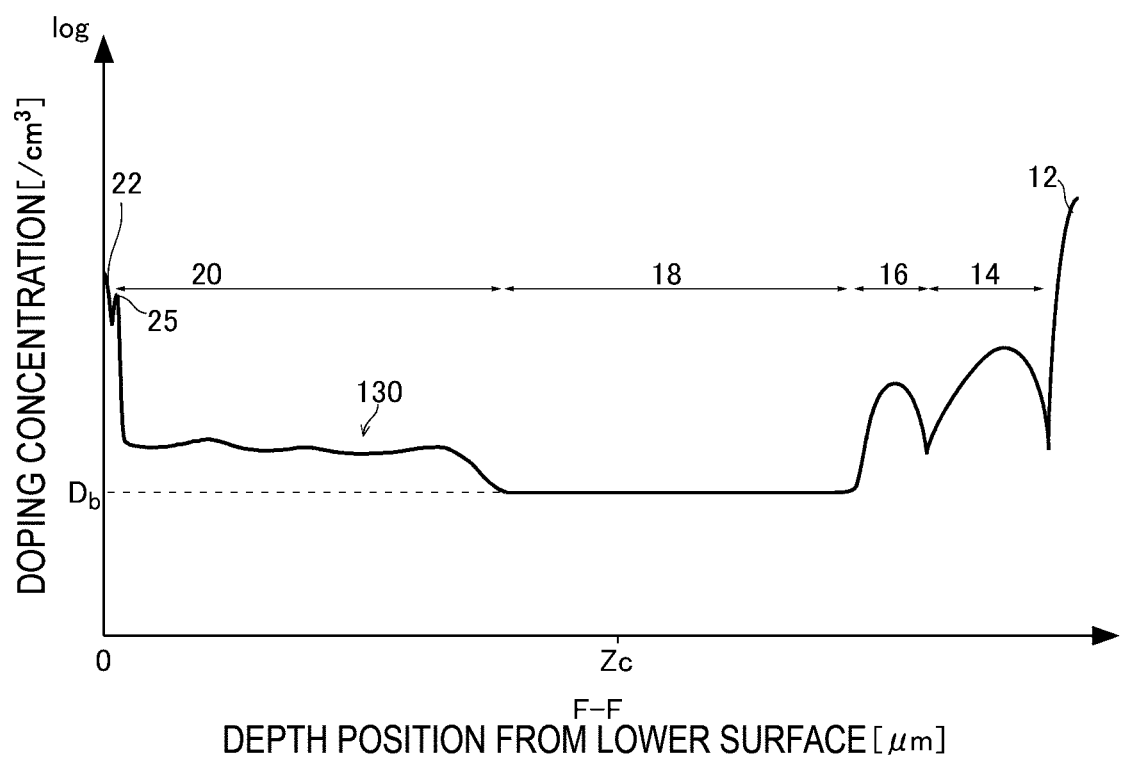
FIG. 5A is a diagram showing another example of the doping concentration distribution in the depth direction, at the position of the line F-F in FIG. 3.

FIG. 5A is a diagram showing another example of the doping concentration distribution in the depth direction, at the position of the line F-F in FIG. 3. This example is different from the example of FIG. 4A in that one concentration peak 25 is provided. The distribution of other portions is similar to that of the example of FIG. 4A.

Figure 5B:
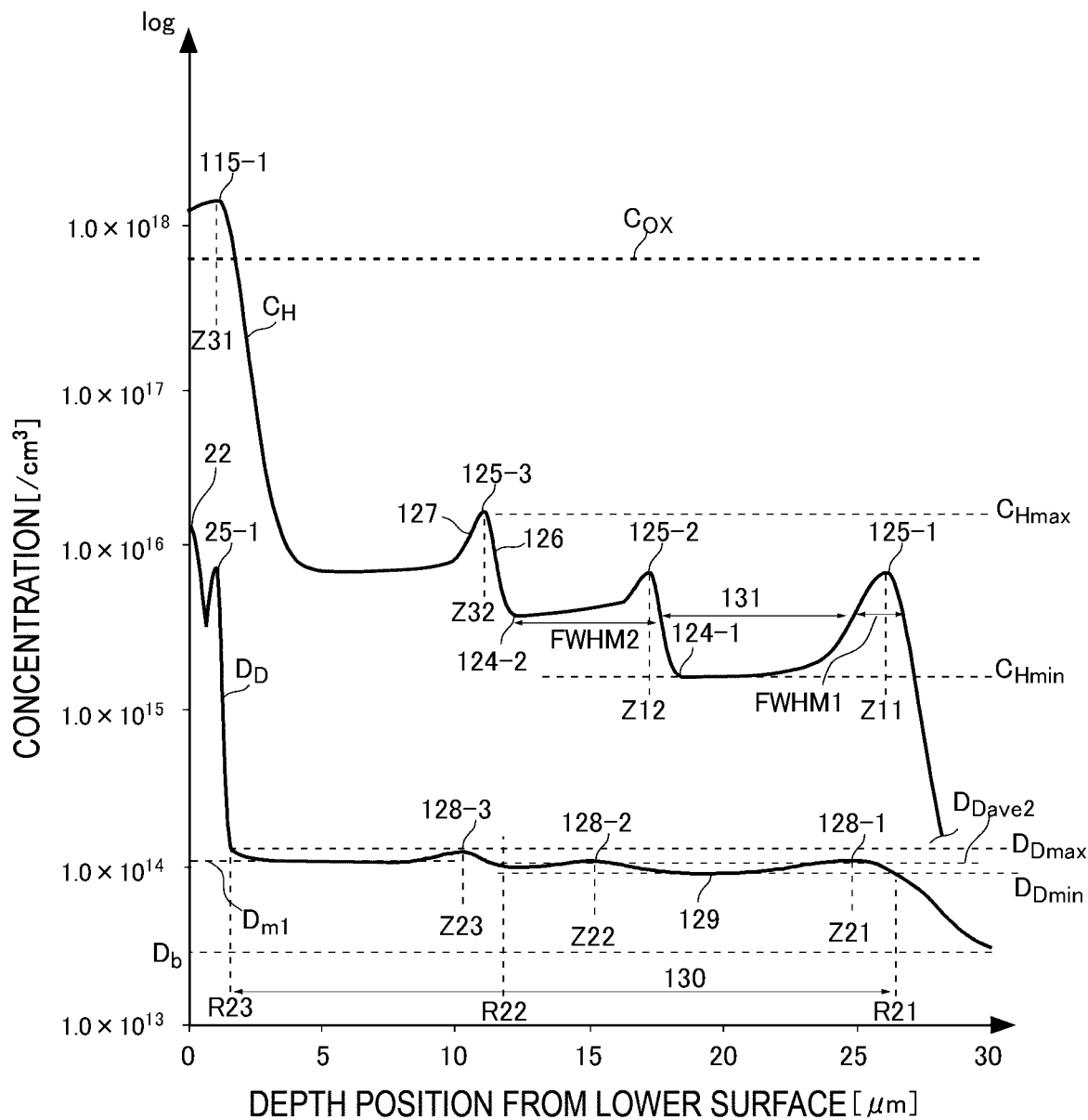
FIG. 5B is a diagram showing a distribution example of the doping concentration $D_D$ and the hydrogen chemical concentration $C_H$ in the buffer region 20 in FIG. 5A, in the depth direction.

FIG. 5B is a diagram showing a distribution example of the doping concentration $D_D$ and the hydrogen chemical concentration $C_H$ in the buffer region 20 of FIG. 5A, in the depth direction. The concentration peak 25-2 in the example of FIG. 4B is a concentration peak 128-3 in the flat region 130 in the present example. The second high-concentration hydrogen peak 115-2 in the example of FIG. 4B is a third low-concentration hydrogen peak 125-3 in the present example. Other distributions are similar to those of the example of FIG. 4B.

By setting the hydrogen chemical concentration of the third low-concentration hydrogen peak 125-3 to be equivalent to the concentration of the second low-concentration hydrogen peak 125-2, the doping concentration of the concentration peak 128-3 is made equivalent to that of the concentration peak 128-2. The hydrogen chemical concentration of the third low-concentration hydrogen peak 125-3 may be higher than that of the second low-concentration hydrogen peak 125-2 and lower than that of the high-concentration hydrogen peak 115-1. The doping concentration of the concentration peak 128-3 may be higher than that of the concentration peak 128-2 and lower than that of the concentration peak 25-1.

When calculating the average value of the doping concentrations of the flat region 130 in the present example, the position of the edge on the lower surface 23 side of the flat region 130 may be the position R22 described in FIG. 4B or the position R23 shown in FIG. 5B. The position R23 is a position at which the value of the doping concentration at the tail on the upper surface 21 side of the concentration peak 25-1 becomes the same as that of the doping concentration at the position Z23 in the concentration peak 128-3. In the present example, the position of the edge on the upper surface 21 side of the flat region 130, for which the average value is to be calculated, may be similar to that of the example of FIG. 4B. An average value $D_{Dave2}$ of the doping concentrations in the flat region 130 when the flat region 130 is provided from the position R23 to the position R21 may be a value obtained by dividing a value, which is obtained by integrating the doping concentrations across from the position R21 to the position R23, by a length between the position R21 and the position R23. In another example, similar to FIG. 4B, the average value $D_{Dave}$ of the doping concentrations in the flat region 130 may be calculated with the position of the edge on the lower surface 23 side of the flat region 130 being the position R22.

The doping concentration distribution between the concentration peak 25-1 and the concentration peak 128-3 may include the local minimum value $D_{m1}$. The average value $D_{Dave2}$ of the flat region 130 may be equal to or smaller than the local minimum value $D_{m1}$, or may be smaller than the local minimum value $D_{m1}$. The maximum value $D_{Dmax}$ of the flat region 130 may be equal to or smaller than the local minimum value $D_{m1}$, or may be smaller than the local minimum value $D_{m1}$. The minimum value $D_{Dmin}$ of the flat region 130 may be equal to or smaller than the local minimum value $D_{m1}$, or may be smaller than the local minimum value $D_{m1}$.

Figure 6:
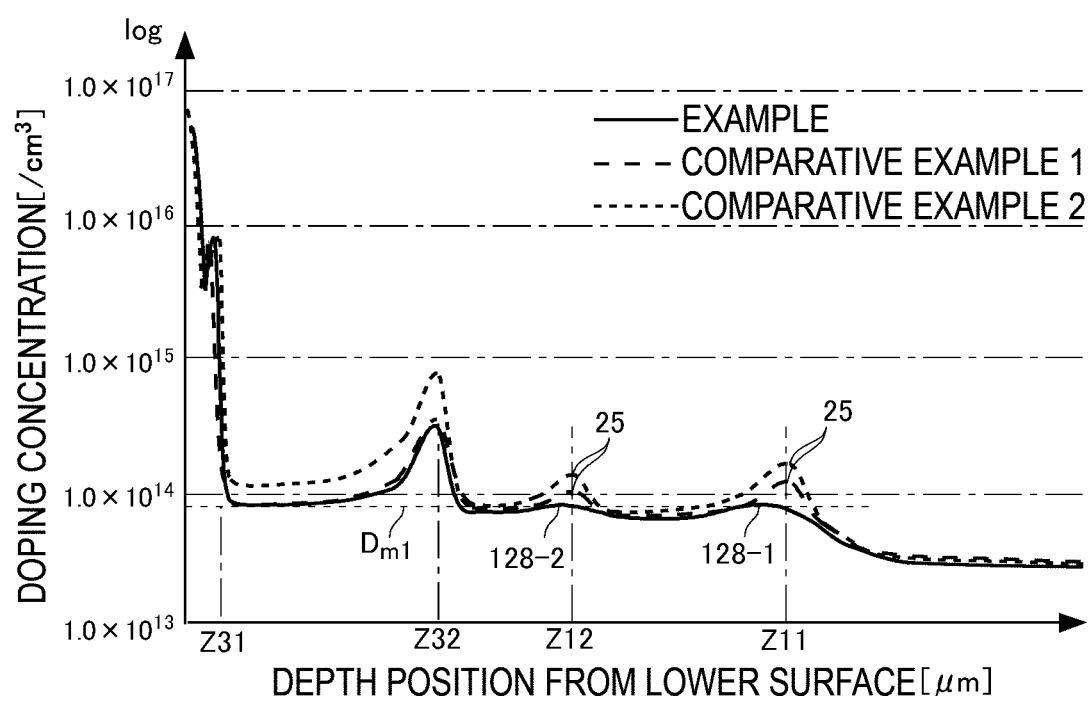
FIG. 6 is a diagram showing the doping concentration distribution in the buffer region 20 according to an example and comparative examples.

FIG. 6 is a diagram showing a doping concentration distribution of the buffer region 20 according to an example and comparative examples. The example is similar to the doping concentration distribution shown in FIG. 4B. In the example, the hydrogen ion dosage at the depth position Z11 is $1.0\times10^{12}$ ions/cm$^2$, the hydrogen ion dosage at the depth position Z12 is $5.0\times10^{11}$ ions/cm$^2$, the hydrogen ion dosage at the depth position Z32 is $4.0\times10^{12}$ ions/cm$^2$, and the hydrogen ion dosage at the depth position Z31 is $5.0\times10^{14}$ ions/cm$^2$. In the example, no large peak of the doping concentration appeared in the vicinity of the depth positions Z11 and Z12.

In a comparative example 1, the hydrogen ion dosage at the depth position Z11 is $2.0\times10^{12}$ ions/cm$^2$, the hydrogen ion dosage at the depth position Z12 is $1.0\times10^{12}$ ions/cm$^2$, the hydrogen ion dosage at the depth position Z32 is $4.0\times10^{12}$ ions/cm$^2$, and the hydrogen ion dosage at the depth position Z31 is $5.0\times10^{14}$ ions/cm$^2$. In the comparative example 1, the concentration peaks 25 of the doping concentration appeared in the vicinity of the depth positions Z11 and Z12. In particular, a relatively large concentration peak 25 exists at the depth position Z11.

In a comparative example 2, the hydrogen ion dosage at the depth position Z11 is $3.0\times10^{12}$ ions/cm$^2$, the hydrogen ion dosage at the depth position Z12 is $1.5\times10^{12}$ ions/cm$^2$, the hydrogen ion dosage at the depth position Z32 is $1.0\times10^{13}$ ions/cm$^2$, and the hydrogen ion dosage at the depth position Z31 is $3.0\times10^{14}$ ions/cm$^2$. In the comparative example 2, the concentration peaks 25 of the doping concentration appeared in the vicinity of the depth positions Z11 and Z12. As shown in FIG. 6, by setting the hydrogen ion dosage to be $1.0\times10^{12}$ ions/cm$^2$ or less, it is possible to suppress formation of the concentration peak 25 of the doping concentration.

Figure 7:
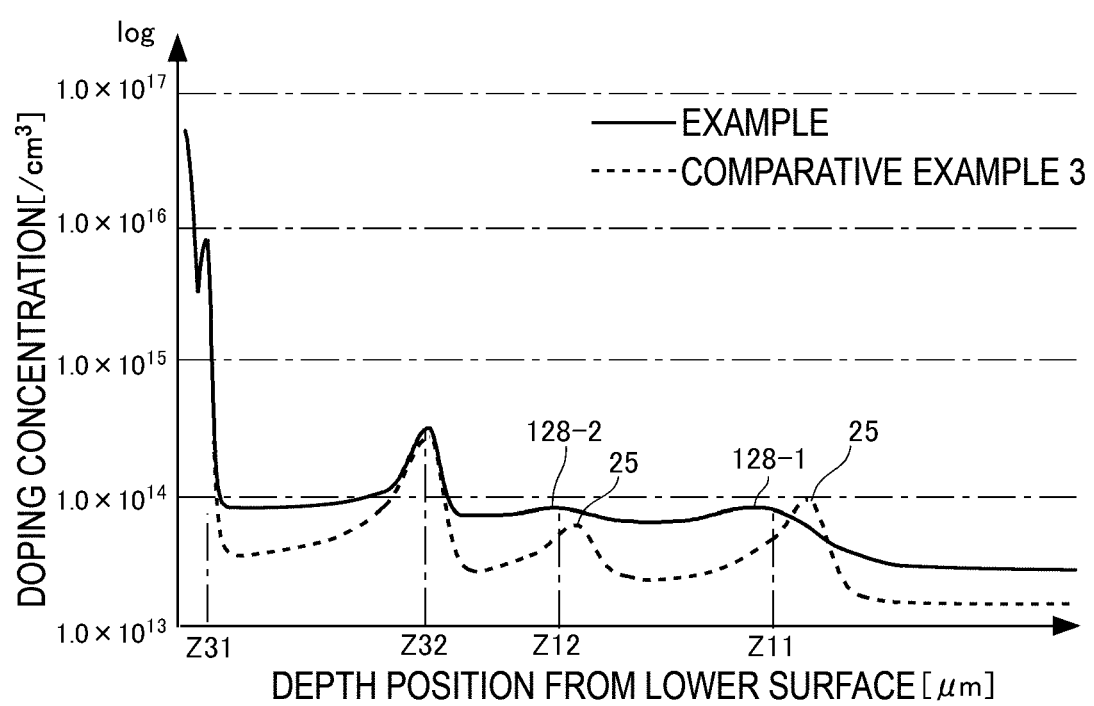
FIG. 7 is a diagram showing the doping concentration distribution in the buffer region 20 according to an example and a comparative example.

FIG. 7 is a diagram showing the doping concentration distribution of the buffer region 20 according to an example and a comparative example. The example is similar to the doping concentration distribution shown in FIG. 6. In a comparative example 3, the hydrogen ion dosages at the respective positions are similar to those of the example. Note that the hydrogen ion implantation positions in the comparative example 3 differ from those of the example. Further, while the oxygen chemical concentration $C_{OX}$ of the semiconductor substrate 10 in the example is $1.0\times10^{17}$ atoms/cm$^3$, the oxygen chemical concentration $C_{OX}$ of the semiconductor substrate in the comparative example 3 is about $1.0\times10^{16}$ atoms/cm$^3$. The semiconductor substrate of the example is an MCZ substrate, and the semiconductor substrate of the comparative example 3 is an FZ substrate.

As shown in FIG. 7, even when the hydrogen ion dosage is $1.0\times10^{12}$ ions/cm$^2$, the concentration peaks 25 of the doping concentration were formed in the comparative example 3 in which the oxygen chemical concentration of the semiconductor substrate is low. On the other hand, in the example, by setting the oxygen chemical concentration $C_{OX}$ of the semiconductor substrate 10 to be $1.0\times10^{17}$ atoms/cm$^3$ or more, the formation of the concentration peak 25 of the doping concentration was suppressed.

Figure 8:
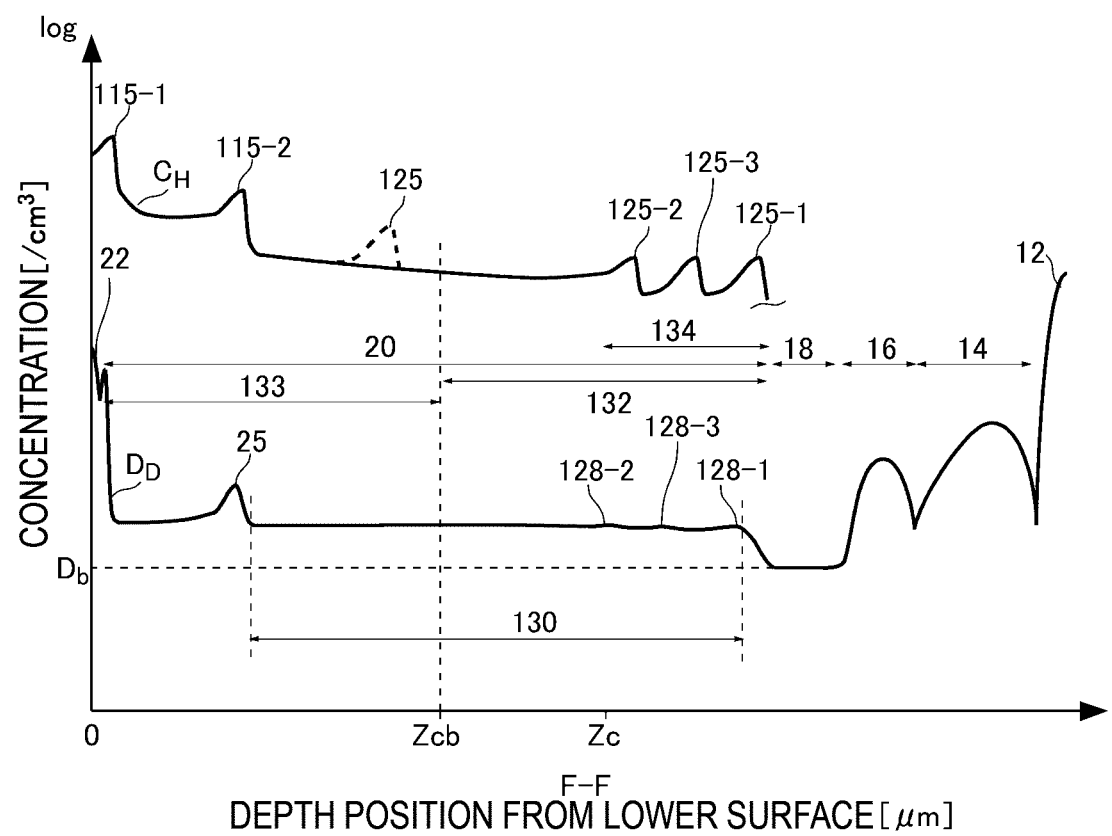
FIG. 8 is a diagram showing another example of the doping concentration distribution in the depth direction, at the position of the line F-F in FIG. 3.

FIG. 8 is a diagram showing another example of the doping concentration distribution in the depth direction, at the position of the line F-F in FIG. 3. In the present example, distributions of the hydrogen chemical concentration $C_H$ and the doping concentration $D_D$ in the buffer region 20 differ from those of the example of FIG. 4A. Other structures are similar to those of the example of FIG. 4A. A length of the flat region 130 of the present example in the depth direction is half or more of the length of the buffer region 20.

In the present example, a center position of the buffer region 20 in the depth direction is represented by Zcb. Of the buffer region 20, a region closer to the lower surface 23 than the center position Zcb is given as a lower-surface side region 133, and a region closer to the upper surface 21 is given as an upper-surface side region 132.

The buffer region 20 includes a plurality of low-concentration hydrogen peaks 125 including the first low-concentration hydrogen peak 125-1 and the second low-concentration hydrogen peak 125-2. In the present example, the number of low-concentration hydrogen peaks 125 arranged in the upper-surface side region 132 is larger than the number of low-concentration hydrogen peaks 125 arranged in the lower-surface side region 133. In the example of FIG. 8, the first low-concentration hydrogen peak 125-1, the second low-concentration hydrogen peak 125-2, and the third low-concentration hydrogen peak 125-3 are arranged in the upper-surface side region 132. The low-concentration hydrogen peak 125 does not need to be arranged in the lower-surface side region 133, or one or more low-concentration hydrogen peaks 125 may be arranged as indicated by a dashed line.

The high-concentration hydrogen peak 115 is not arranged in the upper-surface side region 132 of the present example. One or more high-concentration hydrogen peaks 115 may be arranged in the lower-surface side region 133. With such a configuration, the doping concentration in the upper-surface side region 132 can be planarized. Further, by the concentration peak 25 of the lower-surface side region 133, it is possible to suppress a situation where the depletion layer reaches the collector region 22 or the like.

The flat region 130 may be provided in 80% or more of the region of the upper-surface side region 132, or may be provided in the entire upper-surface side region 132. The flat region 130 may also be provided in a part of the lower-surface side region 133. For example, the flat region 130 may be arranged closer to the upper surface 21 than the concentration peak 25 arranged closest to the upper surface 21 in the lower-surface side region 133.

The flat region 130 may be formed beyond the center position Zc of the semiconductor substrate 10 to reach the region on the upper surface 21 side. The flat region 130 may be formed up to the accumulation region 16. In this case, the low-concentration hydrogen peak 125 may be arranged in the accumulation region 16.

Of regions obtained by dividing the upper-surface side region 132 into two in the depth direction, the region on the upper surface 21 side is given as a tip end region 134. Two or more low-concentration hydrogen peaks 125 may be arranged in the tip end region 134. By implanting hydrogen ions dispersedly at the plurality of depth positions in the tip end region 134, the distribution of the doping concentration $D_D$ in the tip end region 134 can be planarized as compared to a case where the hydrogen ions are implanted at a single depth position in the tip end region 134. Further, an amount of hydrogen ions that pass from the lower surface 23 to the tip end region 134 is secured, and thus it becomes easy to form lattice defects. Therefore, the concentration of the flat region 130 can be increased. In the upper-surface side region 132, the number of low-concentration hydrogen peaks 125 arranged in the tip end region 134 may be larger than the number of low-concentration hydrogen peaks 125 arranged in a region other than the tip end region 134.

Figure 9:
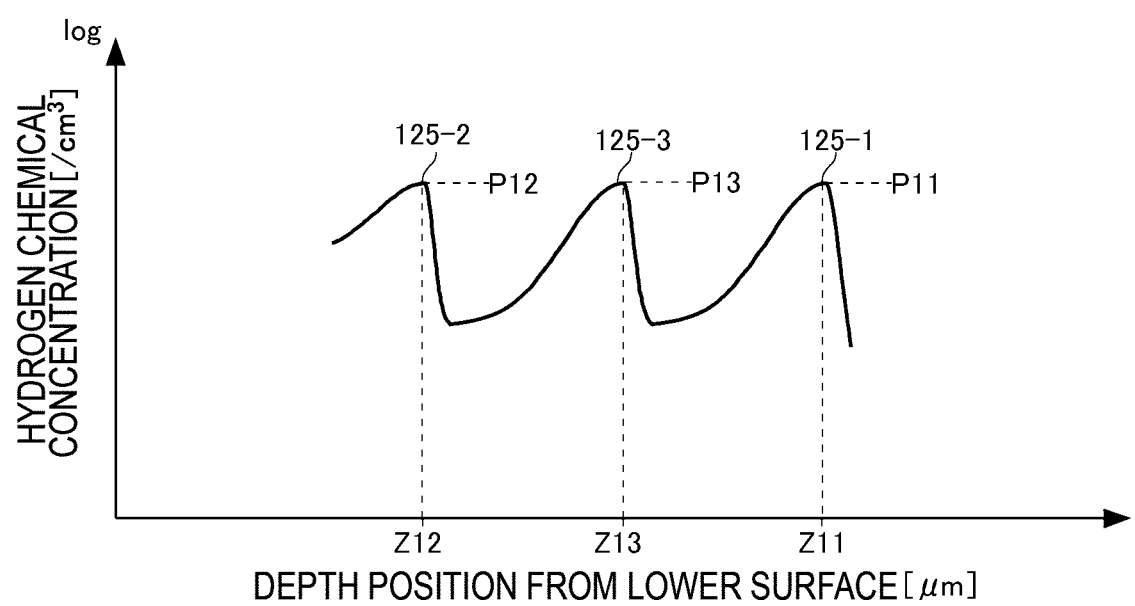
FIG. 9 is an enlarged view of a plurality of low-concentration hydrogen peaks 125 arranged adjacently.

FIG. 9 is an enlarged view of the plurality of low-concentration hydrogen peaks 125 arranged adjacently. The plurality of low-concentration hydrogen peaks 125 of the present example may be arranged in the tip end region 134 shown in FIG. 8, the upper-surface side region 132, or the buffer region 20, for example.

Hydrogen chemical concentrations P11, P12, and P13 at apexes of the respective low-concentration hydrogen peaks 125 may be the same, or may be different from one another. In the example of FIG. 9, the hydrogen chemical concentrations P11, P12, and P13 are the same.

Intervals Z11-Z13 and Z13-Z12 among the apexes of the respective low-concentration hydrogen peaks 125 may be the same, or may be different from each other. In the example of FIG. 9, the interval Z11-Z13 and the interval Z13-Z12 are the same.

Figure 10:
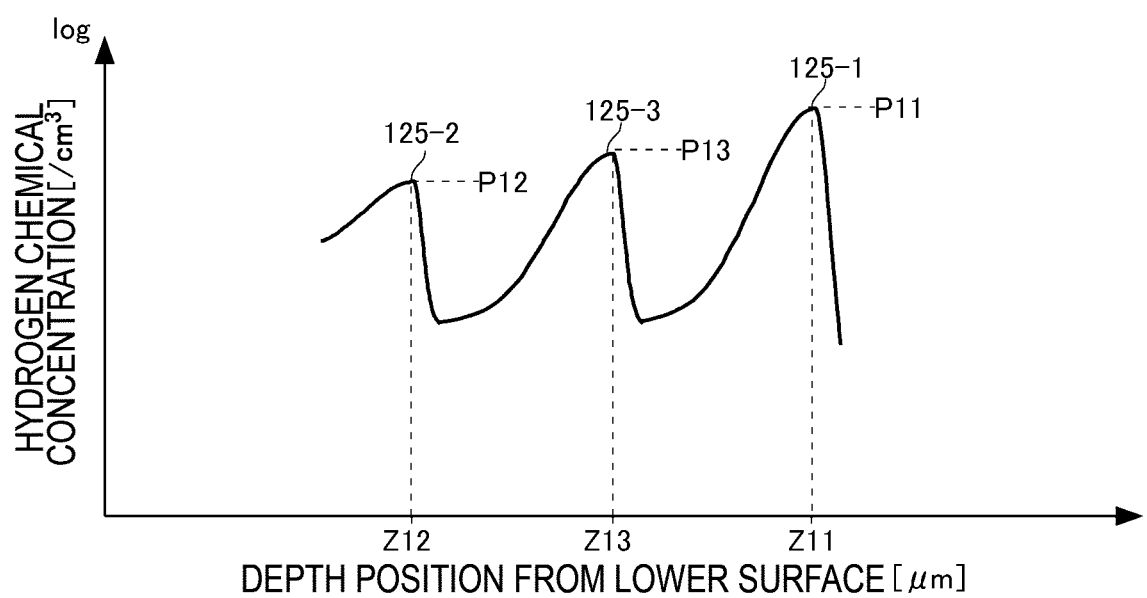
FIG. 10 is a diagram showing another example of the plurality of low-concentration hydrogen peaks 125 arranged adjacently.

FIG. 10 is a diagram showing another example of the plurality of low-concentration hydrogen peaks 125 arranged adjacently. The plurality of low-concentration hydrogen peaks 125 of the present example may be arranged in the tip end region 134 shown in FIG. 8, the upper-surface side region 132, or the buffer region 20, for example.

In the present example, the hydrogen chemical concentration P11 of the first low-concentration hydrogen peak 125-1 arranged closest to the upper surface 21 is larger than the hydrogen chemical concentrations of other low-concentration hydrogen peaks 125. The hydrogen chemical concentration P12 of the second low-concentration hydrogen peak 125-2 arranged closest to the lower surface 23 is smaller than the hydrogen chemical concentrations of other low-concentration hydrogen peaks 125. The hydrogen chemical concentrations of the respective low-concentration hydrogen peaks 125 may become larger as distances thereof from the upper surface 21 decrease.

Figure 11:
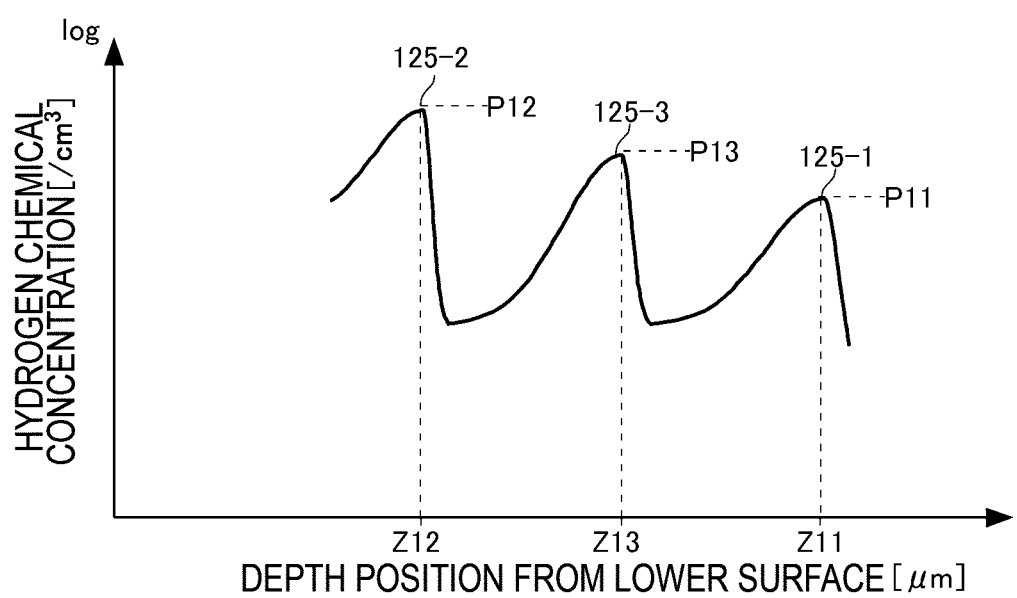
FIG. 11 is a diagram showing another example of the plurality of low-concentration hydrogen peaks 125 arranged adjacently.

FIG. 11 is a diagram showing another example of the plurality of low-concentration hydrogen peaks 125 arranged adjacently. The plurality of low-concentration hydrogen peaks 125 of the present example may be arranged in the tip end region 134 shown in FIG. 8, the upper-surface side region 132, or the buffer region 20, for example.

In the present example, the hydrogen chemical concentration P11 of the first low-concentration hydrogen peak 125-1 arranged closest to the upper surface 21 is smaller than the hydrogen chemical concentrations of other low-concentration hydrogen peaks 125. The hydrogen chemical concentration P12 of the second low-concentration hydrogen peak 125-2 arranged closest to the lower surface 23 is larger than the hydrogen chemical concentrations of other low-concentration hydrogen peaks 125. The hydrogen chemical concentrations of the respective low-concentration hydrogen peaks 125 may become smaller as the distances thereof from the upper surface 21 decrease.

In the examples of FIGS. 10 and 11, the intervals among the low-concentration hydrogen peaks 125 may increase as the distances thereof from the upper surface 21 decrease. The intervals among the low-concentration hydrogen peaks 125 may decrease as the distances thereof from the upper surface 21 decrease.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 semiconductor substrate
11 well region
12 emitter region
14 base region
15 contact region
16 accumulation region
18 drift region
20 buffer region
21 upper surface
22 collector region
23 lower surface
24 collector electrode
25 concentration peak 29 linear portion
30 dummy trench portion
31 edge portion
32 dummy dielectric film
34 dummy conductive portion
38 interlayer dielectric film
39 linear portion
40 gate trench portion
41 edge portion
42 gate dielectric film
44 gate conductive portion
52 emitter electrode
54 contact hole
60, 61 mesa portion
70 transistor portion
80 diode portion
81 extension region
82 cathode region
90 edge termination structure portion
100 semiconductor device
101 outer circumferential gate runner
102 active-side gate runner
115 high-concentration hydrogen peak
124 valley portion
125 low-concentration hydrogen peak
126 upper surface side tail
127 lower surface side tail
128 concentration peak
129 local minimum portion
130 flat region
131 region
132 upper-surface side region
133 lower-surface side region
134 tip end region
160 active portion
162 end side
164 gate pad

What is claimed is:
1. A semiconductor device, comprising:
a semiconductor substrate having an upper surface and a lower surface, the semiconductor substrate including a bulk donor and oxygen;
a buffer region at least partially provided on a side of the lower surface of the semiconductor substrate, the buffer region having a doping concentration higher than a bulk donor concentration;
a hydrogen chemical concentration in the buffer region including a plurality of hydrogen concentration peaks each having a peak value that is either above a predetermined concentration value defining a high-concentration hydrogen region or below the predetermined concentration value defining a low-concentration hydrogen region;
a first low-concentration hydrogen peak arranged in the buffer region;
a second low-concentration hydrogen peak arranged in the buffer region at a position closer to the lower surface than the first low-concentration hydrogen peak;
a high-concentration hydrogen peak arranged in the buffer region at a position closer to the lower surface than the second low-concentration hydrogen peak, the high-concentration hydrogen peak being higher than the second low-concentration hydrogen peak; and
the doping concentration in the buffer region having a flat region having the doping concentration being substantially constant and including a region between the first low-concentration hydrogen peak and the second low-concentration hydrogen peak,
wherein the doping concentration includes a first doping concentration peak closest to the lower surface, a second doping concentration peak closer to the upper surface than the first doping concentration peak, a third doping concentration peak closer to the upper surface than the second doping concentration peak, and a fourth doping concentration peak closer to the upper surface than the third doping concentration peak,
wherein a position R21 is at an edge on an upper surface side of the flat region, and a position R22 is at an edge on a lower surface side of the flat region, the position R21 being a position at which a value of the doping concentration becomes a same as that of the doping concentration of a local minimum portion having a local minimum doping concentration $D_{Dmin}$ between the third doping concentration peak and the fourth doping concentration peak, the position R21 being closer to the upper surface than the fourth doping concentration peak, the position R22 being a position at which a value of the doping concentration at a tail on the upper surface side of the second doping concentration peak becomes a same as that of the third doping concentration peak,
wherein an average value $D_{Dave}$ of the doping concentration in the flat region is obtained by dividing a value which is obtained by integrating the doping concentration across from the position R21 to the position R22, by a length between the position R21 and the position R22,
wherein the doping concentration in the flat region is more than or equal to $D_{Dmin}$,
wherein a doping concentration peak of a doping concentration distribution in the flat region in a depth direction corresponds to the second low-concentration hydrogen peak, and
wherein the doping concentration of the flat region undulates,
wherein the doping concentration in the flat region is higher than the bulk donor concentration, and a variation of the doping concentration in the flat region is +/−30% or less, which means the average value $D_{Dave}$ of the doping concentration $D_D$ in the flat region is represented by $D_{Dave}$, a maximum value of the doping concentration $D_D$ in the flat region is represented by $D_{Dmax}$, and a minimum value of the doping concentration $D_D$ in the flat region is represented by $D_{Dmin}$, the maximum value $D_{Dmax}$ being 1.3 times or less of the average value $D_{Dave}$, and the minimum value $D_{Dmin}$ being 0.7 times or more of the average value $D_{Dave}$,
wherein a variation ratio R2 of the maximum value $D_{Dmax}$ to the minimum value $D_{Dmin}$ in the flat region is defined as $D_{Dmax}/D_{Dmin}$, a variation ratio R1 of a maximum value $C_{Hmax}$ to a minimum value $C_{Hmin}$ of the hydrogen chemical concentration in the flat region is defined as $C_{Hmax}/C_{Hmin}$, and R2/R1 is less than 1/4, and
wherein a width of the doping concentration peak of the doping concentration distribution corresponding to one of the plurality of hydrogen concentration peaks of the hydrogen chemical concentration distribution in the flat region is larger than a width of the corresponding one of the plurality of hydrogen concentration peaks of the hydrogen chemical concentration distribution.

2. The semiconductor device according to claim 1, wherein
the fourth doping concentration peak is arranged closer to the lower surface of the semiconductor substrate than the second low-concentration hydrogen peak.

3. The semiconductor device according to claim 1, wherein
a length of the flat region in the depth direction is half or more of a length of the buffer region.

4. The semiconductor device according to claim 1, wherein
the average value $D_{Dave}$ of the doping concentration of the flat region is 0.01% or more and 3% or less of an oxygen chemical concentration of the semiconductor substrate.

5. The semiconductor device according to claim 1, wherein
an oxygen chemical concentration of the semiconductor substrate is 10 times or more of a hydrogen chemical concentration of the first low-concentration hydrogen peak.

6. The semiconductor device according to claim 1, wherein
an interval (μm) between the first low-concentration hydrogen peak and the second low-concentration hydrogen peak is $3/10^{16}$ (μm/(atoms/cm³)) times or less of an oxygen chemical concentration (atoms/cm³) of the semiconductor substrate.

7. The semiconductor device according to claim 1, wherein
a hydrogen chemical concentration of the first low-concentration hydrogen peak is $1.0 \times 10^{16}$ atoms/cm³ or less, and
an interval between the first low-concentration hydrogen peak and the second low-concentration hydrogen peak is 100 μm or less.

8. The semiconductor device according to claim 1, wherein
the buffer region includes a lower-surface side region closer to the lower surface than a center of the buffer region, and an upper-surface side region closer to the upper surface than the center of the buffer region,
the buffer region includes a plurality of low-concentration hydrogen peaks including the first low-concentration hydrogen peak and the second low-concentration hydrogen peak, and
a number of the low-concentration hydrogen peaks arranged in the upper-surface side region is larger than a number of the low-concentration hydrogen peaks arranged in the lower-surface side region.

9. The semiconductor device according to claim 8, wherein
a hydrogen chemical concentration of the plurality of low-concentration hydrogen peaks is $1 \times 10^{16}$/cm³ or less.

10. The semiconductor device according to claim 1, wherein
the doping concentration of the flat region is twice or more of the bulk donor concentration.

11. The semiconductor device according to claim 1, wherein
the doping concentration of the flat region is $0.7 \times 10^{13}$/cm³ or more.

12. The semiconductor device according to claim 1, wherein
each of the first low-concentration hydrogen peak and the second low-concentration hydrogen peak includes a lower tail provided from an apex of a peak toward the lower surface of the semiconductor substrate and an upper tail provided from the apex toward the upper surface of the semiconductor substrate, and
a hydrogen chemical concentration of the upper tail decreases more precipitously than a hydrogen chemical concentration of the lower tail.

13. The semiconductor device according to claim 1, wherein
an oxygen chemical concentration of the semiconductor substrate is $1.0 \times 10^{17}$ atoms/cm³ or more.

14. The semiconductor device according to claim 1, wherein
a hydrogen ion dosage of the first low-concentration hydrogen peak is $1.0 \times 10^{12}$ ions/cm² or less.

15. The semiconductor device according to claim 1, wherein
a hydrogen ion dosage of the second low-concentration hydrogen peak is $1.0 \times 10^{12}$ ions/cm² or less.

16. The semiconductor device according to claim 1, wherein
the average value $D_{Dave}$ of the doping concentration of the flat region is equal to or smaller than a local minimum value of a doping concentration between the second low-concentration hydrogen peak and the high-concentration hydrogen peak.

17. The semiconductor device according to claim 1, wherein
the buffer region includes a third low-concentration hydrogen peak arranged at a position closer to the upper surface than the high-concentration hydrogen peak and closer to the lower surface than the second low-concentration hydrogen peak,
the flat region includes the third low-concentration hydrogen peak, and
an average value of the doping concentration of the flat region is equal to or smaller than a local minimum value of a doping concentration between the third low-concentration hydrogen peak and the high-concentration hydrogen peak.

18. The semiconductor device according to claim 1, wherein
a length of the flat region in the depth direction is half or more of a length of the buffer region.

19. A semiconductor device according to claim 1, wherein
each apex of the plurality of doping concentration peaks is arranged closer to the lower surface of the semiconductor substrate than an apex of a corresponding one of the plurality of hydrogen concentration peaks.

* * * * *